United States Patent
Sawatzki et al.

(10) Patent No.: US 9,224,074 B2
(45) Date of Patent: Dec. 29, 2015

(54) SYSTEM AND METHOD FOR TUNING DEVICE LINK PROFILES FOR COLOR PRINTING

(71) Applicant: Consolidated Graphics, Inc., Houston, TX (US)

(72) Inventors: Cory Sawatzki, Katy, TX (US); Henry Anderson, Medford, OR (US)

(73) Assignee: CONSOLIDATED GRAPHICS, INC., Houston, TX (US)

( * ) Notice: Subject to any disclaimer, the term of this patent is extended or adjusted under 35 U.S.C. 154(b) by 0 days.

(21) Appl. No.: 13/739,870

(22) Filed: Jan. 11, 2013

(65) Prior Publication Data

US 2013/0128289 A1 May 23, 2013

Related U.S. Application Data

(63) Continuation-in-part of application No. 13/208,079, filed on Aug. 11, 2011.

(51) Int. Cl.
| | |
|---|---|
| *G06F 3/12* | (2006.01) |
| *G06K 15/00* | (2006.01) |
| *H04N 1/403* | (2006.01) |
| *H04N 1/00* | (2006.01) |
| *G03F 3/10* | (2006.01) |
| *H04N 1/23* | (2006.01) |
| *G06K 15/02* | (2006.01) |
| *H04N 1/60* | (2006.01) |

(52) U.S. Cl.
CPC ............... *G06K 15/02* (2013.01); *H04N 1/603* (2013.01)

(58) Field of Classification Search
CPC ..... H04N 1/4006; H04N 9/74; H04N 1/6027; H04N 1/603; H04N 1/4015; H04N 1/6055; H04N 1/6033
USPC .................. 358/1.9, 523, 3.24, 518, 2.1, 504; 347/243
See application file for complete search history.

(56) References Cited

U.S. PATENT DOCUMENTS

| | | | | |
|---|---|---|---|---|
| 5,937,087 | A * | 8/1999 | Sasanuma et al. | 382/167 |
| 6,222,639 | B1 * | 4/2001 | Suzuki | 358/1.9 |
| 6,917,445 | B2 * | 7/2005 | Kuno et al. | 358/1.9 |
| 6,995,870 | B2 | 2/2006 | Holub | |
| 7,019,867 | B2 * | 3/2006 | Kuwata et al. | 358/1.9 |
| 7,126,718 | B1 * | 10/2006 | Newman et al. | 358/1.9 |
| 7,274,489 | B2 * | 9/2007 | Yamada | 358/1.9 |
| 7,312,897 | B2 | 12/2007 | Holub | |
| 7,411,697 | B2 * | 8/2008 | Kuno | 358/1.9 |
| 7,710,560 | B2 | 5/2010 | Holub | |
| 7,729,008 | B2 | 6/2010 | Holub | |
| 7,791,761 | B2 | 9/2010 | Holub | |
| 7,821,526 | B2 * | 10/2010 | Nagata et al. | 347/131 |
| 7,830,546 | B2 | 11/2010 | Holub | |
| 7,880,942 | B1 * | 2/2011 | Phillips et al. | 358/518 |

(Continued)

OTHER PUBLICATIONS

United States Patent and Trademark Office, "Office Action", issued in connection with U.S. Appl. No. 13/208,079, mailed on Nov. 1, 2013, 33 pages.

(Continued)

*Primary Examiner* — Akwasi M Sarpong
(74) *Attorney, Agent, or Firm* — Hanley, Flight & Zimmerman, LLC

(57) ABSTRACT

A system and method according to which device link profiles (DLPs) for color printing are tuned or otherwise adjusted.

14 Claims, 12 Drawing Sheets

(56) References Cited

U.S. PATENT DOCUMENTS

| | | | |
|---|---|---|---|
| 7,978,366 B2* | 7/2011 | Ming | 358/1.9 |
| 8,018,633 B2* | 9/2011 | Kuno | 358/523 |
| 8,102,566 B2* | 1/2012 | Hatori | 358/1.9 |
| 8,279,236 B2 | 10/2012 | Holub | |
| 8,520,262 B2* | 8/2013 | Li et al. | 358/3.24 |
| 8,537,357 B2 | 9/2013 | Holub et al. | |
| 8,638,340 B2 | 1/2014 | Holub | |
| 8,760,704 B2 | 6/2014 | Holub | |
| 8,817,314 B2 | 8/2014 | Holub | |
| 8,917,394 B2 | 12/2014 | Holub | |
| 2002/0036787 A1* | 3/2002 | Kondo | 358/1.9 |
| 2003/0103222 A1* | 6/2003 | Kato et al. | 358/1.9 |
| 2003/0202192 A1* | 10/2003 | Kuwata et al. | 358/1.9 |
| 2005/0213128 A1* | 9/2005 | Imai et al. | 358/1.9 |
| 2007/0268357 A1* | 11/2007 | Nagata et al. | 347/243 |
| 2010/0097669 A1* | 4/2010 | Roscoe et al. | 358/504 |
| 2010/0231936 A1* | 9/2010 | Nagai | 358/1.9 |
| 2013/0038884 A1 | 2/2013 | Anderson et al. | |
| 2013/0135686 A1* | 5/2013 | Abe et al. | 358/406 |

OTHER PUBLICATIONS

United States Patent and Trademark Office, "Notice of Allowance", issued in connection with U.S. Appl. No. 13/208,079, mailed on Apr. 15, 2014, 55 pages.

United States Patent and Trademark Office, "Notice of Allowability", issued in connection with U.S. Appl. No. 13/208,079, mailed on Sep. 11, 2014, 47 pages.

United States Patent and Trademark Office, "Notice of Allowance," issued in connection with U.S. Appl. No. 13/208,079, mailed on Jul. 28, 2015, 57 pages.

* cited by examiner

```
┌─────────────────────────────────────────────────────────────┐
│                     DLP   136a'                             │
│  ┌─────────────────────────────────────────────────────────┐│
│  │         PLURALITY OF IDENTIFIERS   148                  ││
│  │  ┌───────────────────────────────────────────────────┐  ││
│  │  │  LOCATION IDENTIFIER 150 THAT IDENTIFIES LOCATION 124│││
│  │  ├───────────────────────────────────────────────────┤  ││
│  │  │  DEVICE IDENTIFIER 152 THAT IDENTIFIES PRINTING DEVICE 122│││
│  │  ├───────────────────────────────────────────────────┤  ││
│  │  │  CLIENT/COLOR STANDARD 154 THAT IDENTIFIES ANOTHER ││
│  │  │  PREDETERMINED CLIENT/COLOR STANDARD (E.G., ICC CMYK)│││
│  │  ├───────────────────────────────────────────────────┤  ││
│  │  │  SUBSTRATE IDENTIFIER 153 THAT IDENTIFIES         │  ││
│  │  │  STANDARD CALIBRATION PAPER STOCK                 │  ││
│  │  └───────────────────────────────────────────────────┘  ││
│  └─────────────────────────────────────────────────────────┘│
└─────────────────────────────────────────────────────────────┘

┌─────────────────────────────────────────────────────────────┐
│                     DLP   136b'                             │
│  ┌─────────────────────────────────────────────────────────┐│
│  │         PLURALITY OF IDENTIFIERS   148                  ││
│  │  ┌───────────────────────────────────────────────────┐  ││
│  │  │  LOCATION IDENTIFIER 150 THAT IDENTIFIES LOCATION 124│││
│  │  ├───────────────────────────────────────────────────┤  ││
│  │  │  DEVICE IDENTIFIER 152 THAT IDENTIFIES PRINTING DEVICE 122│││
│  │  ├───────────────────────────────────────────────────┤  ││
│  │  │  CLIENT/COLOR STANDARD 154 THAT IDENTIFIES ANOTHER ││
│  │  │  PREDETERMINED CLIENT/COLOR STANDARD (E.G., ICC CMYK)│││
│  │  ├───────────────────────────────────────────────────┤  ││
│  │  │  SUBSTRATE IDENTIFIER 153 THAT IDENTIFIES ANOTHER SUBSTRATE│││
│  │  │  OTHER THAN SUBSTRATE STANDARD CALIBRATION PAPER STOCK│││
│  │  └───────────────────────────────────────────────────┘  ││
│  └─────────────────────────────────────────────────────────┘│
└─────────────────────────────────────────────────────────────┘

┌─────────────────────────────────────────────────────────────┐
│                     DLP   136c'                             │
│  ┌─────────────────────────────────────────────────────────┐│
│  │         PLURALITY OF IDENTIFIERS   148                  ││
│  │  ┌───────────────────────────────────────────────────┐  ││
│  │  │  LOCATION IDENTIFIER 150 THAT IDENTIFIES LOCATION 124│││
│  │  ├───────────────────────────────────────────────────┤  ││
│  │  │  DEVICE IDENTIFIER 152 THAT IDENTIFIES PRINTING DEVICE 122│││
│  │  ├───────────────────────────────────────────────────┤  ││
│  │  │  CLIENT/COLOR STANDARD 154 THAT IDENTIFIES ANOTHER ││
│  │  │  PREDETERMINED CLIENT/COLOR STANDARD (E.G., ICC CMYK)│││
│  │  ├───────────────────────────────────────────────────┤  ││
│  │  │  SUBSTRATE IDENTIFIER 153 THAT IDENTIFIES YET ANOTHER│││
│  │  │  SUBSTRATE OTHER THAN STANDARD CALIBRATION PAPER STOCK│││
│  │  └───────────────────────────────────────────────────┘  ││
│  └─────────────────────────────────────────────────────────┘│
└─────────────────────────────────────────────────────────────┘
```

*Fig. 18*

SYSTEM AND METHOD FOR TUNING DEVICE LINK PROFILES FOR COLOR PRINTING

CROSS-REFERENCE TO RELATED APPLICATION

This application is a continuation-in-part of U.S. application Ser. No. 13/208,079, filed Aug. 11, 2011, the entire disclosure of which is incorporated herein by reference.

BACKGROUND

The present disclosure relates in general to color printing, and in particular to a system and method for tuning device link profiles (DLPs) for color printing.

BRIEF DESCRIPTION OF THE DRAWINGS

FIG. 18 contains diagrammatic illustrations of tuned versions of another plurality of device link profiles of FIG. 9, according to an exemplary embodiment.

DETAILED DESCRIPTION

Figure 1:
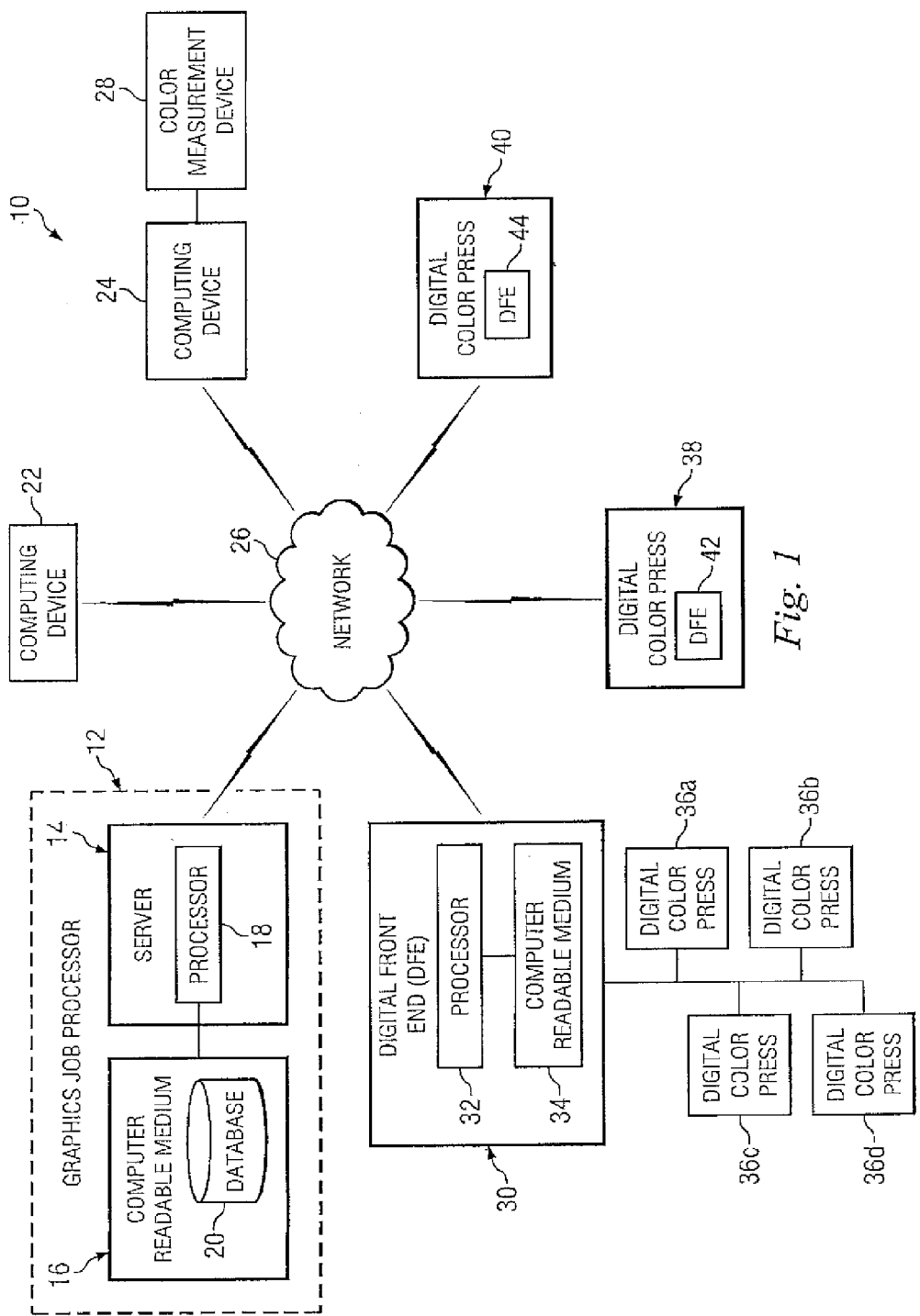
FIG. 1 is a diagrammatic illustration of a system according to an exemplary embodiment, the system including a plurality of computing devices, a color measurement device, and a plurality of digital color presses.

In an exemplary embodiment, as illustrated in FIG. 1, a digital process control system ("Digital PCS") for managing the color performance of a digital print job in process, that is, during the production run of the digital print job, is generally referred to by the reference numeral 10. The system 10 includes a graphics job processor 12, which includes a server 14 and a computer readable medium 16. The server 14 includes a computer processor 18, which is operably coupled to the computer readable medium 16. Instructions accessible to, and executable by, the processor 18 are stored on the computer readable medium 16. A database 20 is also stored on the computer readable medium 16.

Computing devices 22 and 24 are operably coupled to, and in communication with, the server 14 via a network 26. A color measurement device 28 is operably coupled to, and in communication with, the computing device 24. In an exemplary embodiment, the color measurement device 28 is operably coupled to, and in communication with, the computing device 24 via the network 26. A digital front end (DFE) 30 is operably coupled to, and in communication with, the server 14 via the network 26. The digital front end 30 includes a processor 32 and a computer readable medium 34 operably coupled thereto. Instructions accessible to, and executable by, the processor 32 are stored on the computer readable medium 34. Digital color presses 36a, 36b, 36c and 36d are operably coupled to, and in communication with, the digital front end 30. Digital color presses 38 and 40 are operably coupled to, and in communication with, the server 14 via the network 26. The digital color presses 38 and 40 include on-board digital front ends (DFEs) 42 and 44, respectively. The digital front end 30 at least partially controls the digital color presses 36a, 36b, 36c and 36d, and the digital front ends 42 and 44 at least partially control the digital color presses 38 and 40, respectively.

In an exemplary embodiment, the server 14 is a file server/job processor with a stand-alone application. In an exemplary embodiment, the server 14 is a web application server, which in several exemplary embodiments includes and/or executes one or more web-based computer programs, Intranet-based computer programs, and/or any combination thereof. In an exemplary embodiment, the network 26 includes the Internet, one or more local area networks, one or more wide area networks, one or more cellular networks, one or more wireless networks, one or more voice networks, one or more data networks, one or more communication systems, and/or any combination thereof.

In several exemplary embodiments, one or more of the components of the system 10 and/or content stored therein, and/or any combination thereof, are parts of, and/or are distributed throughout, the system 10 and/or one or more other components thereof. In several exemplary embodiments, the platforms of the system 10 are identical, different, or vary with respect to equipment, peripherals, hardware architecture and/or specifications, software architecture and/or specifications, and/or any combination thereof.

Figure 2:
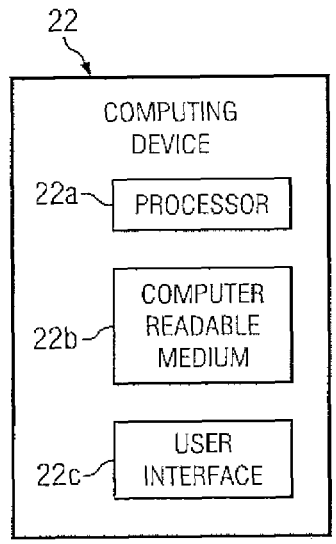
FIG. 2 is a diagrammatic illustration of one of the computing devices of FIG. 1, according to an exemplary embodiment.

In an exemplary embodiment, as illustrated in FIG. 2 with continuing reference to FIG. 1, the computing device 22 includes a processor 22a and a computer readable medium 22*b* operably coupled thereto. Instructions accessible to, and executable by, the processor 22*a* are stored on the computer readable medium 22*b*. The computing device 22 further includes a user interface 22*c*, which is provided in whole or in part by the processor 22*a*'s execution of the instructions stored on the computer readable medium 22*b*, and/or the operation of one or more output devices such as, for example, a multi-touch screen or other graphical display, and one or more input devices such as, for example, a keyboard, a mouse or other pointing device, or a pin pad. In an exemplary embodiment, the computing device 22 is a thin client and the server 14 controls at least a portion of the operation of the computing device 22. In an exemplary embodiment, the computing device 22 is a thick client, and/or functions as both a thin client and a thick client. In several exemplary embodiments, the computing device 22 is a workstation, personal computer, portable computer, smartphone, personal digital assistant (PDA), cell phone, another type of computer system, and/or any combination thereof.

In an exemplary embodiment, the computing device 24 is identical to the computing device 22 and thus also includes a processor and a computer readable medium operably coupled thereto; the computing device 24 will not be described in further detail. In several exemplary embodiments, one of the computing devices 22 and 24 can be omitted in favor of the other of the computing devices 22 and 24. In several exemplary embodiments, the computing device 22 is combined in whole or in part with the computing device 24.

In an exemplary embodiment, color management software is loaded on the computing device 24. In an exemplary embodiment, the color management software is stored on the computer readable medium of the computing device 24. In an exemplary embodiment, the color management software loaded on the computer device 24 and/or stored on the computer readable medium thereof is, includes, or is part of, Fuji Taskero color management software/system, which is available from FUJIFILM North America Corporation, Valhalla, N.Y., and/or Maxwell color management software/system, which is available from CHROMiX, Inc., Seattle, Wash.

Figure 3:
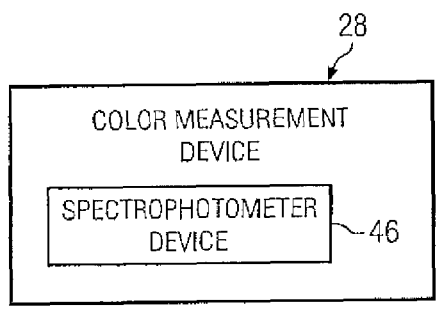
FIG. 3 is a diagrammatic illustration of the color measurement device of FIG. 1, according to an exemplary embodiment.

In an exemplary embodiment, as illustrated in FIG. 3 with continuing reference to FIGS. 1 and 2, the color measurement device 28 is, or includes, a spectrophotometer device 46. In an exemplary embodiment, the spectrophotometer device 46 is, includes, or is part of, an Eye-One iSis (or i1iSis) automated chart reader, which is available from X-Rite, Incorporated, Grand Rapids, Mich. In an exemplary embodiment, the spectrophotometer device 46 is, includes, or is part of, an Eye-One iO (or i1iO) automatic chart reading system, which is also available from X-Rite, Incorporated.

Figure 4:
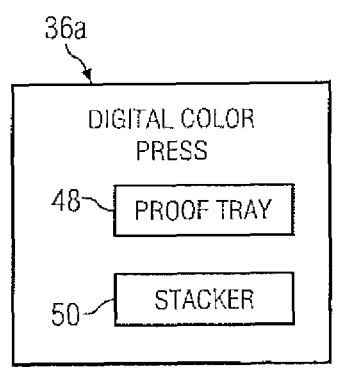
FIG. 4 is a diagrammatic illustration of one of the digital color presses of FIG. 1, according to an exemplary embodiment.

In an exemplary embodiment, as illustrated in FIG. 4 with continuing reference to FIGS. 1-3, the digital color press 36*a* includes a proof tray 48 and a stacker 50. Color targets are adapted to be printed to the proof tray 48, under conditions to be described below. Color print jobs are adapted to be printed to the stacker 50, under conditions to be described below. Although not shown in the figures, the digital color presses 36*b*, 36*c* and 36*d* also include corresponding ones of the proof tray 48 and the stacker 50. In an exemplary embodiment, one or more of the digital color presses 36*a*, 36*b*, 36*c* and 36*d* is an HP Indigo Press, which is available from Hewlett-Packard Company, Palo Alto, Calif. In an exemplary embodiment, the digital front end 30 (FIG. 1) is an HP Ultra Scalable Rip Solution (SRS) DFE, which is also available from Hewlett-Packard Company, and each of the digital color presses 36*a*, 36*b*, 36*c* and 36*d* is an HP Indigo Press. In an exemplary embodiment, one or more of the digital color presses 36*a*, 36*b*, 36*c* and 36*d* is a Xeikon 6000, which is available from Xeikon International BV, Belgium. In an exemplary embodiment, the digital front end 30 (FIG. 1) is a Xeikon DFE, which is also available from Xeikon International BV, and each of the digital color presses 36*a*, 36*b*, 36*c* and 36*d* is a Xeikon 6000.

In an exemplary embodiment, although not shown in the figures, the digital color presses 38 and 40 further include corresponding ones of the proof tray 48 and the stacker 50, in addition to including the on-board digital front ends 42 and 44, respectively, as noted above. In an exemplary embodiment, each of the digital color presses 38 and 40 is a NexPress Digital Color Production Color Press, which is available from Eastman Kodak Company, Rochester, N.Y.

Figure 5:
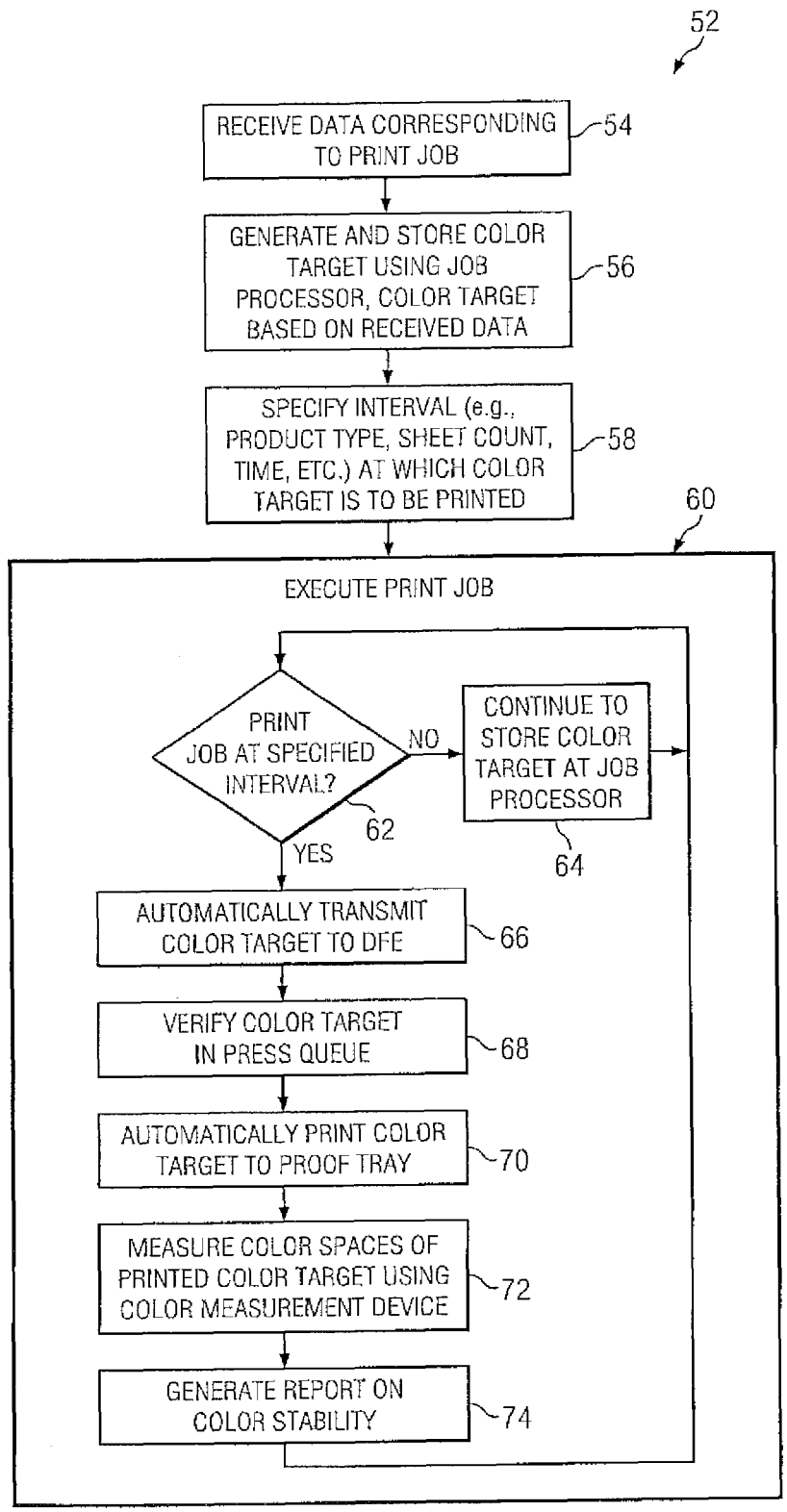
FIG. 5 is a flow chart illustration of a method of operating the system of FIG. 1, according to an exemplary embodiment.

In an exemplary embodiment, as illustrated in FIG. 5 with continuing reference to FIGS. 1-4, a method of operating the system 10 is generally referred to by the reference numeral 52. In several exemplary embodiments, the method 52 is implemented in whole or in part using the graphics job processor 12, the computing device 22, the computing device 24, the color measurement device 28, the digital front end 30, the digital color presses 36*a*, 36*b*, 36*c*, 36*d*, 38 and 40, and/or any combination thereof.

As shown in FIG. 5, the method 52 includes a step 54, at which data corresponding to a color print job is received. In an exemplary embodiment, to receive the data at the step 54, one or more portable document format (pdf) files containing the color print job are received by the graphics job processor 12, and the pdf files are stored in the database 20. In an exemplary embodiment, the data received at the step 54 may be variable data and/or data for a single job with multiple alike prints.

Before, during or after the step 54, at step 56 a color target is generated and stored using the job processor 12, the color target being based on the data received in the step 54. In an exemplary embodiment, the color target generated at the step 56 includes one or more color spaces such as, for example, red-green-blue (RGB) color spaces, or cyan-magenta-yellow-black (CMYK) color spaces. In an exemplary embodiment, the color target generated at the step 56 provides target(s) for specific color profile(s) with specific tolerance(s), and/or includes one or more color space profiles, tolerances, DFE setups, etc. In an exemplary embodiment, to generate the color target at the step 56, job processing software is executed using one or more of the processors 18 and 22*a*, and the job processing software is used to generate and store the color target. In an exemplary embodiment, the job processing software used at the step 56 is stored in whole or in part on the computer readable medium 16 and/or the computer readable medium 22*b*. In an exemplary embodiment, the job processing software used at the step 56 is dependent upon the customer, client, entity or person who supplied the data received at the step 54, as well as on the print job itself, including aspects or parameters thereof. In an exemplary embodiment, at the step 56, the generated color target is stored in whole or in part in the database 20, the computer readable medium 16, the computer readable medium 22*b*, and/or any combination thereof.

In an exemplary embodiment, at the step 56, a press lead opens or otherwise executes the job processing software in order to generate and store the color target. Alternatively, in an exemplary embodiment, at the step 56, the color target is automatically generated and stored in response to receiving the data corresponding to the print job at the step 54.

Before, during or after the step 56, at step 58 an interval at which the color target is to be printed is specified. In an exemplary embodiment, to specify the interval at the step 58, the interval is determined based on one or more factors such as, for example, product type, sheet count, time, etc. In an exemplary embodiment, the interval specified at the step 58 is a certain sheet count or number of sheets (e.g., 500 sheets) for one product type (such as a book, pamphlet, magazine, manual, etc.), and is another number of sheets (e.g., 250 sheets) for another product type. In an exemplary embodiment, the interval specified at the step 58 is a time interval such as, for example, thirty minutes, one hour, one day, etc. In an exemplary embodiment, the interval is automatically specified at the step 58 in response to receiving the data corresponding to the print job at the step 54. In an exemplary embodiment, the step 58 is combined with the step 56 and thus the interval at which the color target is to be printed is specified during the generation of the color target in the step 56.

Before, during or after the step 58, at step 60 the color print job, to which the data received at the step 54 corresponds, is executed. In an exemplary embodiment, to execute the print job at the step 60, print job data, which is the data received at the step 54, and/or data based thereon, is transmitted from the server 14 to one of the digital front ends 30, 42 and 44. If the server 14 transmits the print job data to the digital front end 30, the digital front end 30 processes the print job data and operates to cause one of the presses 36a, 36b, 36c and 36d to begin to print the color print job and thus print sheets of material in color to the corresponding stacker 50. If the server 14 transmits the print job data to the digital front end 42 or 44, the digital front end 42 or 44 processes the print job data and operates to cause the press 38 or 40, respectively, to begin to print the color print job and thus print sheets of material in color to the corresponding stacker 50.

Before, during or after the step 60, it is determined at step 62 whether the print job is at the interval specified in the step 58. For example, if the interval specified in the step 58 is a sheet count interval of 500 sheets, it is initially determined at the step 62 whether the 500$^{th}$ sheet of the print job has been printed since the initiation of the execution of the print job at the step 60. And at any subsequent executions of the step 62, it is determined whether 500 sheets have been printed since the previous instance it was determined at the step 62 that the print job was at the interval specified in the step 58. For another example, if the interval specified in the step 58 is a time interval of five minutes, it is determined at the step 62 whether five minutes have elapsed since the initiation of the execution of the print job at the step 60. And at any subsequent executions of the step 62, it is determined whether five minutes have elapsed since the previous instance it was determined at the step 62 that the print job was at the interval specified in the step 58.

If it is determined at the step 62 that the print job is not yet at the interval specified at the step 58, the storage of the generated color target in whole or in part at the job processor 12 is continued, as indicated by step 64. The steps 62 and 64 are repeated until it is determined at the step 62 that the print job is indeed at the interval specified at the step 58. In several exemplary embodiments, the step 62 can be executed using a clock, and/or a counter, with the count value provided by the counter being compared with the interval specified at the step 58. In an exemplary embodiment, the clock and/or counter is controlled by, and/or is part of, the server and/or the processor 18 thereof.

If it is determined at the step 62 that the print job is at the interval specified at the step 58, then the color target is automatically transmitted at step 66 to the digital front end 30, 42 or 44 to which the print job data was transmitted in order to initiate execution of the step 60. The digital front end 30, 42 or 44 places the color target in the press queue for the digital color press 36a, 36b, 36c, 36d, 38 or 40 being used to execute the print job at the step 60. The digital front end 30, 42 or 40 shows the color target as in the press queue and ready to print.

During or after the step 66, the presence of the color target in the press queue is verified at step 68. In an exemplary embodiment, verification is made at the step 68 by a press operator. In an exemplary embodiment, verification is automatically made at the step 68 as a result of the digital front end 30, 42 or 44 automatically sending a notification to the server 14 and/or to the computing device 22, thereby confirming the automatic transmission of the color target.

Before, during or after the step 68, the color target is automatically printed to the corresponding proof tray 48 at step 70. In an exemplary embodiment, after the color target has been automatically printed to the proof tray 48 at the step 70, the press operator may verify the print quality of the color target, reviewing the color target visually for any press defects that may impact the measurement of the color target (such measurement is to be described below), and/or verifying that all elements of the color target have printed correctly.

During or after the step 70, the color spaces of the printed color target are measured at step 72 using the color measurement device 28. In an exemplary embodiment, the color spaces of the printed color target are measured at the step 72 using the spectrophotometer device 46. In an exemplary embodiment, at the step 72, the printed color target is read by the spectrophotometer device 46 and the results are transmitted to the computing device 24 for processing. In an exemplary embodiment, at the step 72, a press operator measures the color spaces of the printed color target using the spectrophotometer device 46, as well as the color management software loaded on the computing device 24 and/or stored on the computer readable medium thereof.

During or after the step 72, a report on color stability is generated at step 74. In an exemplary embodiment, to generate the color stability report at the step 74, the color management software loaded on the computing device 24, and/or stored on the computer readable medium thereof, compiles and/or otherwise processes the color space measurements taken at the step 72, providing real time reporting on the color stability of the digital color press 36a, 36b, 36c, 36d, 38 or 40 being used to execute the print job at the step 60. In an exemplary embodiment, at the step 74, the execution of the color management software loaded on the computing device 24 results in one or more comparisons between the color space measurements taken at the step 72, and target readings to the specified color profile for the print job executed at the step 60, i.e., a reference set of expected color values corresponding to the color profile for the print job executed at the step 60. In an exemplary embodiment, at the step 74, the execution of the color management software loaded on the computing device 24 provides information on color variance of the color space measurements taken at the step 72 using Delta-E (dE) levels, with dE being a unit of measure that calculates and quantifies the difference between two colors, one of which is a reference color and the other is a sample color that attempts to match the reference color (the higher the dE, the greater the difference between the two colors). In an exemplary embodiment, standards for dE variance are preset in the color management software and thus are used at the step 74. In an exemplary embodiment, at the step 74, the execution of the color management software loaded on the computing device 24 results in the generation of a pass/fail notification.

During or after the step 74, the report generated at the step 74 is reviewed by the press operator and/or the press lead. Based on the report generated at the step 74, the press operator and/or the press lead will determine any necessary maintenance routines needed for color correction on press either pre-run or mid-production run based on the output timing of the color target, that is, at the time the color target was printed at the step 70, or at the point the color target was printed at the step 70 during the print job executed at the step 60. In several exemplary embodiments, during or after the step 74, problems with the digital color press 36a, 36b, 36c, 36d, 38 or 40 being used to execute the print job at the step 60 are detected; for example, it may be determined that dE is trending upwards on cyan. Accordingly, color adjustments may be made to the digital color press 36a, 36b, 36c, 36d, 38 or 40 being used to execute the print job at the step 60. In several exemplary embodiments, during or after the step 74, operators can monitor/view press trends with respect to the digital color press 36a, 36b, 36c, 36d, 38 or 40 being used to execute the print job at the step 60, and thus detect early warning signs if the digital color press is beginning to go, or trending, out of tolerance.

After the step 74, the step 62 is again executed, in accordance with the foregoing. In several exemplary embodiments, the steps 62, 64, 66, 68, 70, 72 and 74 are repeated as necessary, in accordance with the foregoing, until the print job executed at the step 60 is completed.

In several exemplary embodiments, the operation of the system 10 or the execution of the method 52 enables the monitoring of the color performance of digital printing during a production run by printing a color target automatically in the run. The operation of the system 10 or the execution of the method 52 allows press color performance to be monitored throughout the printing of the product to ensure color stability and fidelity based on the set color target. The operation of the system 10 or the execution of the method 52 enables the provision of groups of color profiles and preset tools for color management on multiple presses, and different presses, at multiple facilities.

Figures 6, 8:
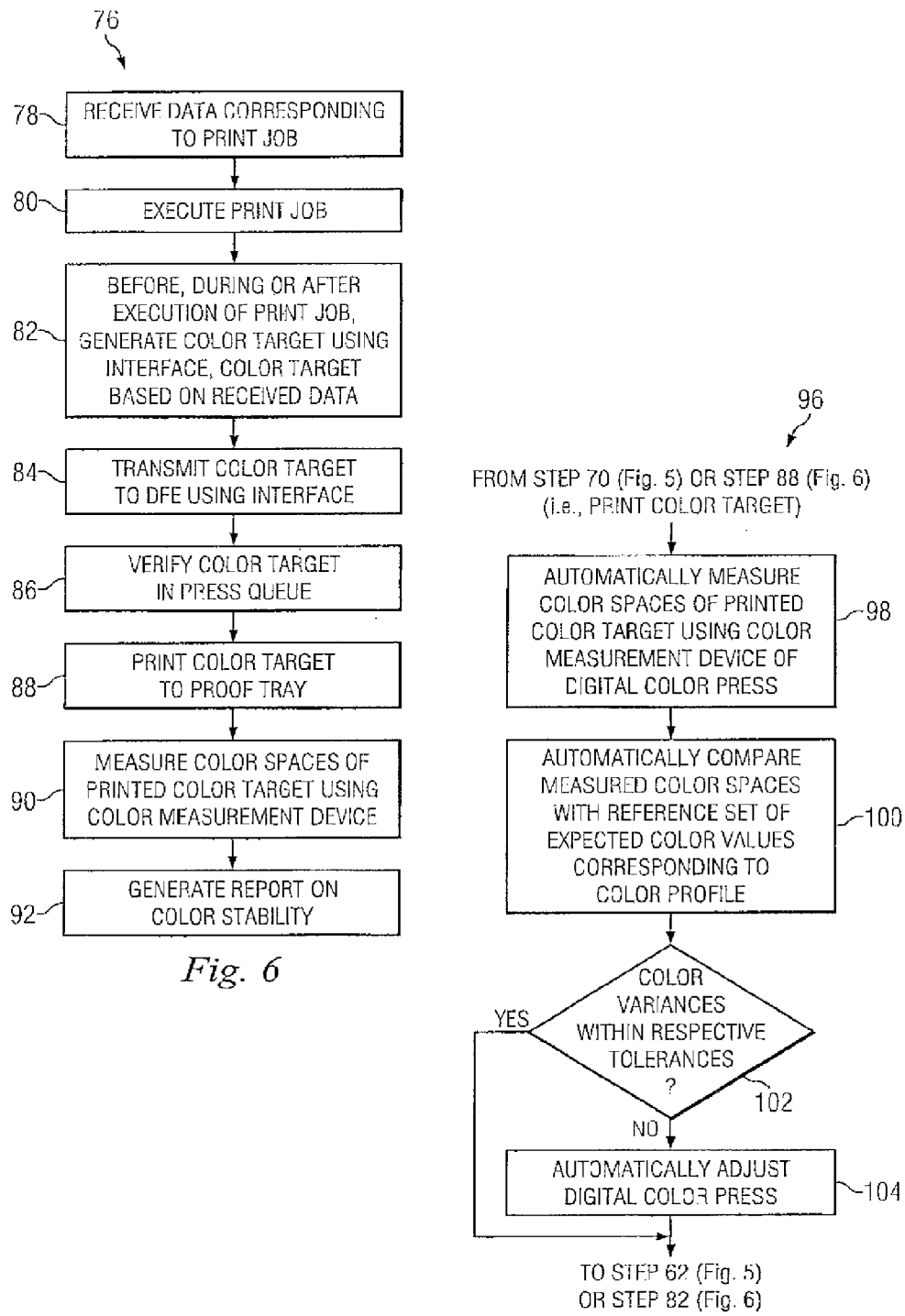
FIG. 6 is a flow chart illustration of a method of operating the system of FIG. 1, according to another exemplary embodiment.
FIG. 8 is a flow chart illustration of a method of operating the system of FIG. 1, including the embodiment of the digital color press shown in FIG. 7, according to an exemplary embodiment.

In an exemplary embodiment, as illustrated in FIG. 6 with continuing reference to FIGS. 1-5, a method of operating the system 10 is generally referred to by the reference numeral 76. In several exemplary embodiments, the method 76 is implemented in whole or in part using the graphics job processor 12, the computing device 22, the computing device 24, the color measurement device 28, the digital front end 30, the digital color presses 36a, 36b, 36c, 36d, 38 and 40, and/or any combination thereof.

As shown in FIG. 6, the method 76 includes a step 78, at which data corresponding to a color print job is received. The step 78 of the method 76 is identical to the step 54 of the method 52 and therefore the step 78 of the method 76 will not be described in further detail.

During or after the step 78, at step 80 the color print job, to which the data received at the step 78 corresponds, is executed. The step 80 of the method 76 is identical to the step 60 of the method 52 and therefore the step 80 of the method 76 will not be described in further detail.

Before, during or after the step 80, at step 82 a color target is generated using the user interface 22c of the computing device 22, the color target being based on the data received in the step 78. In an exemplary embodiment, at the step 82, the color target is generated manually using the user interface 22c. In an exemplary embodiment, at the step 82, tab(s) and/or icon(s) forming part of the user interface 22c are selected by, for example, a press lead, and the color target is generated manually using the user interface 22c. In an exemplary embodiment, the color target generated at the step 82 includes one or more color spaces such as, for example, red-green-blue (RGB) color spaces, or cyan-magenta-yellow-black (CMYK) color spaces. In an exemplary embodiment, the color target generated at the step 82 provides target(s) for specific color profile(s) with specific tolerance(s), and/or includes one or more color space profiles, tolerances, DFE setups, etc.

In an exemplary embodiment, to generate the color target at the step 82, job processing software is executed using one or more of the user interface 22c, the processor 18 of the server 14, and the processor 22a of the computing device 22, and the job processing software is used to generate and store the color target. In an exemplary embodiment, the job processing software used at the step 82 is stored in whole or in part on the computer readable medium 16 and/or the computer readable medium 22b. In an exemplary embodiment, the job processing software used at the step 82 is dependent upon the customer, client, entity or person who supplied the data received at the step 78, as well as on the print job itself, including aspects or parameters thereof. In an exemplary embodiment, at the step 82, the generated color target is stored in whole or in part in the database 20, the computer readable medium 16, the computer readable medium 22b, and/or any combination thereof. In an exemplary embodiment, at the step 82, a press lead opens or otherwise executes the job processing software using the user interface 22c in order to generate and store the color target.

During or after the step 82, at step 84 the color target is transmitted to the digital front end 30, 42 or 44 to which the print job data was transmitted in order to initiate execution of the step 80. In an exemplary embodiment, at the step 84, the digital color press 36a, 36b, 36c, 36d, 38 or 40 being used to execute the print job at the step 80 is selected using the user interface 22c, thereby selecting the corresponding digital front end 30, 42 or 44 to which the color target is to be transmitted. During or after the step 84, the digital front end 30, 42 or 44 places the color target in the press queue for the digital color press 36a, 36b, 36c, 36d, 38 or 40 being used to execute the print job at the step 80. The digital front end 30, 42 or 40 shows the color target as in the press queue and ready to print.

During or after the step 84, the presence of the color target in the press queue is verified at step 86. In an exemplary embodiment, verification is made at the step 68 by a press operator. In an exemplary embodiment, verification is automatically made at the step 86 as a result of the digital front end 30, 42 or 44 automatically sending a notification to the server 14 and/or the computing device 22 confirming the transmission of the color target.

Before, during or after the step 86, the color target is printed to the corresponding proof tray 48 at step 88. In an exemplary embodiment, at the step 88, the color target is manually printed, with a press operator selecting to print the color target to the corresponding proof tray 48 using the corresponding digital front end 30, 42 or 44. In an exemplary embodiment, at the step 88, the color target is automatically printed to the corresponding proof tray 48. In an exemplary embodiment, after the color target has been printed to the proof tray at the step 88, the press operator may verify the print quality of the color target, reviewing the color target visually for any press defects that may impact the measurement of the color target (such measurement is to be described below), and/or verifying that all elements of the color target have printed correctly.

During or after the step 88, the color spaces of the printed color target are measured at step 90 using the color measurement device 28. The step 90 of the method 76 is identical to the step 72 of the method 52 and therefore the step 90 of the method 76 will not be described in further detail.

During or after the step 90, a report on color stability is generated at step 92. The step 92 of the method 76 is identical to the step 74 of the method 52 and therefore the step 92 of the method 76 will not be described in further detail.

During or after the step 92, the report generated at the step 92 is reviewed by the press operator and/or the press lead. Based on the report generated at the step 92, the press operator and/or the press lead will determine any necessary maintenance routines needed for color correction on press either pre-run or mid-production run based on the output timing of the color target, that is, at the time the color target was printed at the step 88, or at the point the color target was printed at the step 88 during the print job executed at the step 80. In several exemplary embodiments, during or after the step 92, problems with the digital color press 36a, 36b, 36c, 36d, 38 or 40 being used to execute the print job at the step 80 are detected; for example, it may be determined that dE is trending upwards on cyan. Accordingly, color adjustments may be made to the digital color press 36a, 36b, 36c, 36d, 38 or 40 being used to execute the print job at the step 80. In several exemplary embodiments, during or after the step 92, operators can monitor/view press trends with respect to the digital color press 36a, 36b, 36c, 36d, 38 or 40 being used to execute the print job at the step 80, and detect early warning signs if the digital color press is beginning to go, or trending, out of tolerance.

In several exemplary embodiments, at any time before, during or after the execution of the print job at the step 80, the steps 82, 84, 86, 88, 90 and 92 may be repeated.

In several exemplary embodiments, the operation of the system 10 or the execution of the method 76 enables the monitoring of the color performance of digital printing during a production run by printing a color target during the production run. The operation of the system 10 or the execution of the method 76 allows press color performance to be monitored throughout the printing of the product to ensure color stability and fidelity based on the set color target. The operation of the system 10 or the execution of the method 76 enables the provision of groups of color profiles and preset tools for color management on multiple presses, and different presses, at multiple facilities.

In an experimental exemplary embodiment, before implementing the method 52 or 76, an experimental production run of an experimental digital color print job yielded an experimental average dE level of 2.10. However, in an experimental exemplary embodiment, by implementing the method 52 or 76, an experimental production run of an experimental digital color print job, which was substantially equivalent to the aforementioned experimental digital color print job, yielded an experimental average dE level of 1.79.

Figure 7:
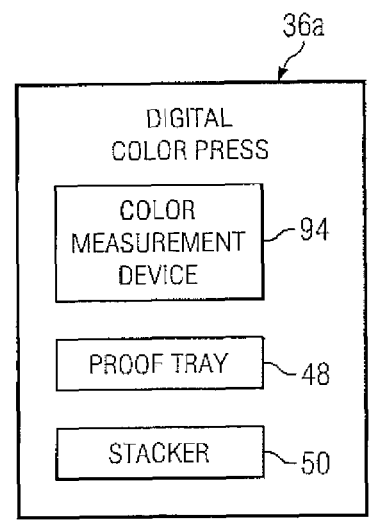
FIG. 7 is a diagrammatic illustration of one of the digital color presses of FIG. 1, according to another exemplary embodiment.

In an exemplary embodiment, as illustrated in FIG. 7 with continuing reference to FIGS. 1-6, the digital color press 36a further includes an inline color measurement device 94, in addition to including respective ones of the proof tray 48 and the stacker 50. In an exemplary embodiment, the inline color measurement device 94 includes, or is part of, the proof tray 48. In an exemplary embodiment, the inline color measurement device 94 is positioned proximate the proof tray 48. In an exemplary embodiment, the inline color measurement device 94 includes the spectrophotometer device 46.

In an exemplary embodiment, as illustrated in FIG. 8 with continuing reference to FIGS. 1-7, a method of operating the system 10, including the embodiment of the digital color press 36a shown in FIG. 7, is generally referred to by the reference numeral 96.

As indicated in FIG. 8, the method 96 is either a modification of the method 52 shown in FIG. 5, or a modification of the method 76 shown in FIG. 6. These two modifications will be discussed in turn.

In an exemplary embodiment, as indicated in FIG. 8, if the method 96 is a modification of the method 52 shown in FIG. 5, the execution of the method 96 first requires the execution of the steps 54, 56, 58, 60, 62, 64, 66, 68 and 70 of the method 52. After the step 70 of the method 52 has been executed, the continued execution of the method 96 requires the omission of the steps 72 and 74 of the method 52, in favor of the execution of steps 98, 100, 102 and 104, which steps are shown in FIG. 8. That is, instead of executing the steps 72 and 74 during the execution of the method 96, the steps 98, 100 and 102 shown in FIG. 8 are executed, as well as the step 104 if necessary. At the step 98 of the method 96, the color spaces of the color target printed to the proof tray 48 at the step 70 are automatically measured using the inline color measurement device 94. In an exemplary embodiment, at the step 98, the color spaces of the color target are automatically measured using the inline color measurement device 94 during, and/or after, the printing of the color target to the proof tray 48 at the step 70. During or after the step 98, at the step 100 the measured color spaces are automatically compared with a reference set of expected color values corresponding to the color profile for the print job executed at the step 60. During or after the step 100, at the step 102 it is automatically determined whether the color variances between the measured color spaces and the reference set of expected color values are within their respective tolerances. If it is determined at the step 102 that the color variances are not within their respective tolerances, then at step 104 the digital color press 36a is automatically adjusted to correct the color variances. In several exemplary embodiments, the steps 100, 102 and 104 are automatically executed using one or more of the digital front end 30, the job processor 12, the computing device 22, and the computing device 24. During or after the step 104, the steps 62, 64, 66, 68, 70, 98, 100, 102 and 104 are repeated as necessary, in accordance with the foregoing. If it is determined at the step 102 that the color variances are within their respective tolerances, then the steps 62, 64, 66, 68, 70, 98, 100, 102 and 104 are repeated as necessary, in accordance with the foregoing.

As noted above, in an exemplary embodiment, instead of the method 96 being a modification of the method 52 shown in FIG. 5, the method 96 can be a modification of the method 76 shown in FIG. 6. More particularly, as indicated in FIG. 8, if the method 96 is a modification of the method 76 shown in FIG. 6, the execution of the method 96 first requires the execution of the steps 78, 80, 82, 84, 86 and 88 of the method 76. After the step 88 of the method 76 has been executed, the continued execution of the method 96 requires the omission of the steps 90 and 92 of the method 76, in favor of the execution of the steps 98, 100, 102 and possibly 104. That is, instead of executing the steps 90 and 92 during the execution of the method 96, the steps 98, 100 and 102 are executed, as well as the step 104 if necessary. At the step 98 of the method 96, the color spaces of the color target printed to the proof tray 48 at the step 88 are automatically measured using the inline color measurement device 94. In an exemplary embodiment, at the step 98, the color spaces of the color target are automatically measured using the inline color measurement device 94 during, and/or after, the printing of the color target to the proof tray 48 at the step 88. During or after the step 98, at the step 100 the measured color spaces are automatically compared with a reference set of expected color values corresponding to the color profile for the print job executed at the step 80. During or after the step 100, at the step 102 it is automatically determined whether the color variances between the measured color spaces and the reference set of expected color values are within their respective tolerances. If it is determined at the step 102 that the color variances are not within their respective tolerances, then at step 104 the digital color press 36a is automatically adjusted to correct the color variances. In several exemplary embodiments, the steps 100, 102 and 104 are automatically executed using one or more of the digital front end 30, the job processor 12, the computing device 22, and the computing device 24. During or after the step 104, the steps 82, 84, 86, 88, 98, 100, 102 and 104 may be repeated as necessary, in accordance with the foregoing. If it is determined at the step 102 that the color variances are within their respective tolerances, then the steps 82, 84, 86, 88, 98, 100, 102 and 104 may be repeated as necessary, in accordance with the foregoing.

In several exemplary embodiments, instead of, or in addition to using the digital color press 36a, the method 96 may be executed using any of the digital color presses 36b, 36c, 36d, 38 and 40, so long as the digital color press includes an inline color measurement device.

Figure 9:
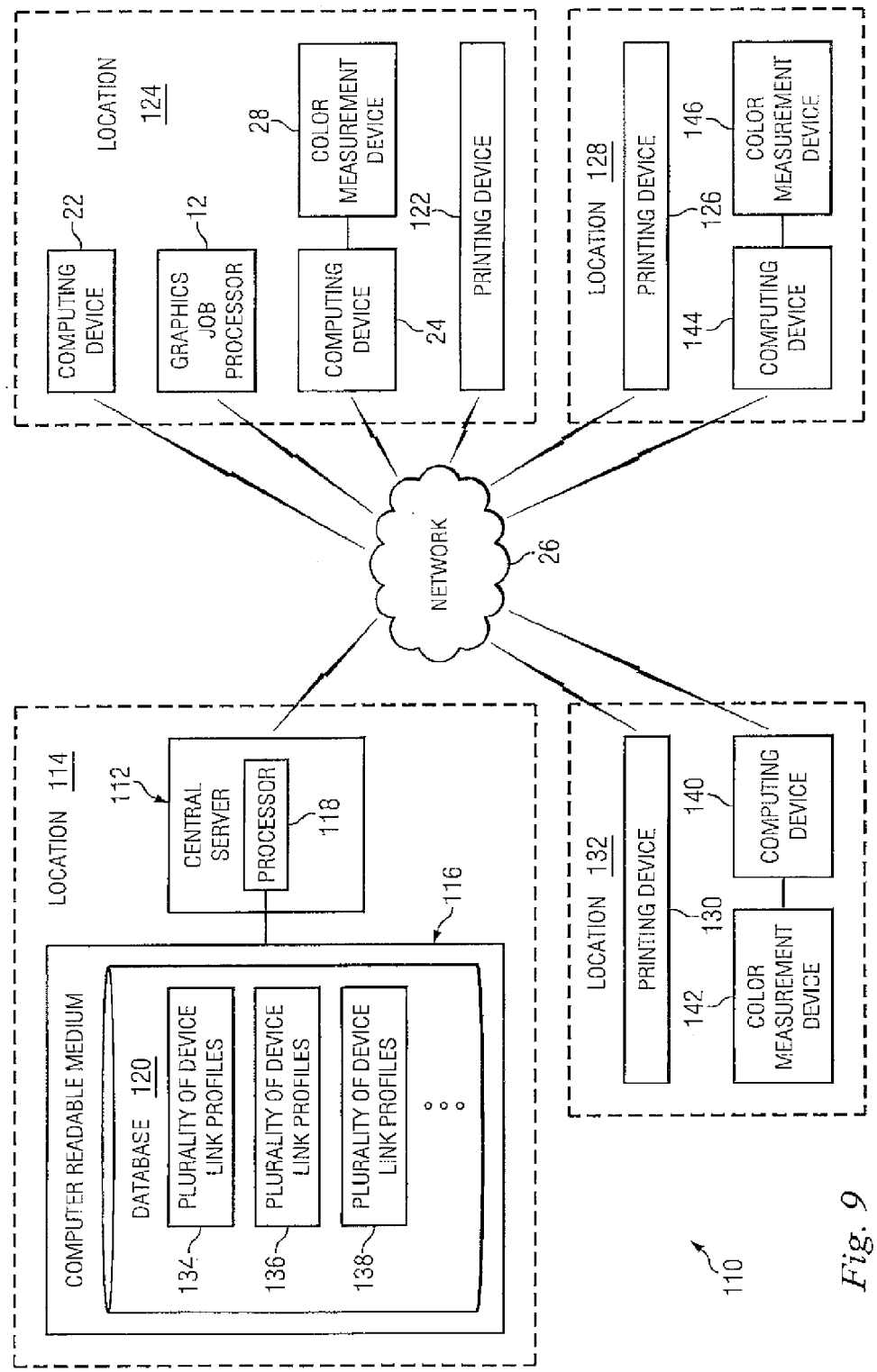
FIG. 9 is a diagrammatic illustration of a system according to an exemplary embodiment, the system including pluralities of device link profiles.

In an exemplary embodiment, as illustrated in FIG. 9 with continuing reference to FIGS. 1-8, a system is generally referred to by the reference numeral 110 and includes several parts of the system 10, which parts are given the same reference numerals. As shown in FIG. 9, the system 110 includes a central server 112 and a computer readable medium 116, both of which are located at a location 114. The central server 112 includes a computer processor 118, which is operably coupled to the computer readable medium 116. Instructions accessible to, and executable by, the processor 118 are stored on the computer readable medium 116. A database 120 is also stored on the computer readable medium 116. In an exemplary embodiment, the central server 112 is a web application server, which in several exemplary embodiments includes and/or executes one or more web-based computer programs, Intranet-based computer programs, and/or any combination thereof. In an exemplary embodiment, the central server 112 is "in the cloud."

The system 110 further includes the graphics job processor 12, the computing devices 22 and 24, the color measurement device 28 and a printing device 122, all of which are located at a location 124. Via the network 26, the central server 112 is in communication with each of the computing device 22, the graphics job processor 12, the computing device 24 and the printing device 122. The color measurement device 28 is operably coupled to, and in communication with, the computing device 24. In an exemplary embodiment, the color measurement device 28 is operably coupled to, and in communication with, the computing device 24 via the network 26. A printing device 126 is located at a location 128, and is operably coupled to, and in communication with, the central server 112 via the network 26. Similarly, a printing device 130 is located at a location 132, and is operably coupled to, and in communication with, the central server 112 via the network 26. Pluralities of device link profiles 134, 136 and 138 are stored in the database 120. The pluralities of device link profiles 134, 136 and 138 will be discussed in further detail below.

In several exemplary embodiments, each of the locations 114, 124, 128 and 132 is located remotely from the other locations (different locations in a building or campus, or different cities, regions, states, countries, etc.).

In several exemplary embodiments, each of the printing devices 122, 126 and 130 is a digital color press, an inkjet web press device, a grand format printing press device, or a digital offset press.

At the location 128, a computing device 140 is operably coupled to, and in communication with, a color measurement device 142. Similarly, at the location 132, a computing device 144 is operably coupled to, and in communication with, a color measurement devices 146. The computing devices 140 and 144 are operably coupled to, and in communication with, the central server 112 via the network 26. In several exemplary embodiments, each of the computing devices 142 and 144 is substantially identical to the computing device 22 or 24, and therefore the computing devices 142 and 144 will not be described in detail. In several exemplary embodiments, each of the color measurement devices 140 and 146 is substantially identical to the color measurement device 28 or 94, and therefore the color measurement devices 140 and 146 will not be described in detail. In several exemplary embodiments, via the network 26, one or more of the foregoing components of the system 110 are in communication with one or more other of the foregoing components of the system 110.

Figure 10:
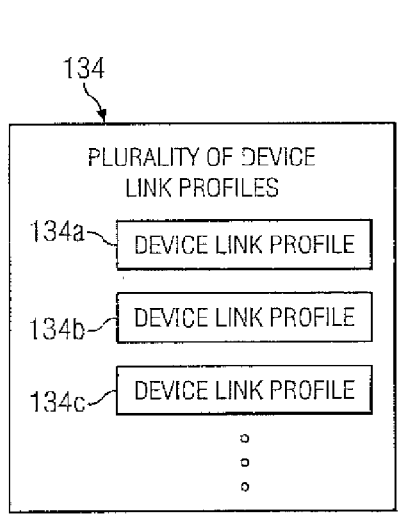
FIG. 10 is a diagrammatic illustration of a plurality of device link profiles of FIG. 9, according to an exemplary embodiment.

In an exemplary embodiment, as illustrated in FIG. 10 with continuing reference to FIGS. 1-9, the plurality of device link profiles 134 includes device link profile 134a, device link profile 134b and device link profile 134c, each of which is, includes, or is part of, electronic data that defines conversion from a source color space profile to a destination space color profile. For example, the device link profile 134a may define a direct cyan-magenta-yellow-black (CMYK) to CMYK transformation. In an exemplary embodiment, each of the device link profiles 134a, 134b and 134c includes a mathematical look-up-table (LUT) or matrix. In several exemplary embodiments, the device link profiles 134a, 134b and 134c are specified by the International Color Consortium (ICC). In several exemplary embodiments, the device link profiles 134a, 134b and 134c are created using one or more computer programs and/or combinations thereof.

Figure 11:
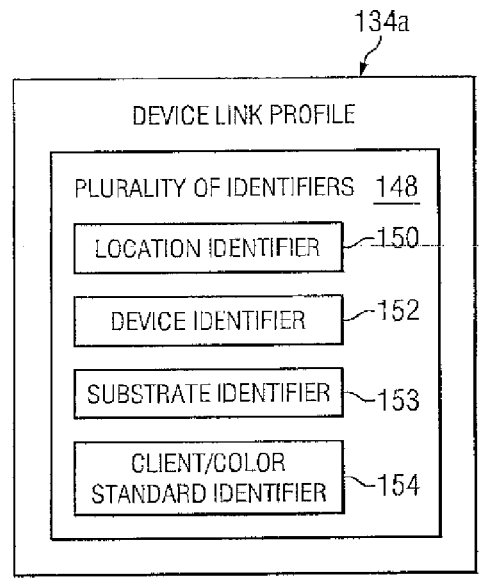
FIG. 11 is a diagrammatic illustration of one of the device link profiles of FIG. 10, according to an exemplary embodiment.

In an exemplary embodiment, as illustrated in FIG. 11 with continuing reference to FIGS. 1-10, the device link profile 134a includes a plurality of identifiers 148. The plurality of identifiers 148 includes: a location identifier 150 that identifies the location of a printing device, such as the location 124, 128 or 132; a device identifier 152 that identifies a printing device, such as the printing device 122, 126 or 130; a substrate identifier 153 that identifies a substrate such as a type of printing stock, such as standard calibration paper stock, gloss paper stock, recycle paper stock, a gloss paper stock associated with a particular person or entity, or a recycle paper stock associated with a particular person or entity; a client/color standard identifier 154 that identifies a client/color standard or color standard, such as ICC CMYK or G7®, which is a trademark of International Digital Enterprise Alliance, Inc., Alexandria, Va.

In an exemplary embodiment, each of the device link profiles 134b and 134c is substantially identical to the device link profile 134a, except that the respective substrate identifiers 153 of the device link profiles 134b and 134c identify different substrates, respectively, than the substrate identified by the device link profile 134a. Therefore, the device link profiles 134b and 134c will not be described in further detail.

In an exemplary embodiment, each of the pluralities of device link profiles 136 and 138 is substantially identical to the plurality of device link profiles 134, except that the location identifiers 150 of each plurality may identify a location other than that identified by the plurality of device link profiles 134, the device identifiers 152 of each plurality may identify a printing device other than that identified by the plurality of device link profiles 134, or the client/color standard identifiers 154 of each plurality may identify a client/color standard other than that identified by the plurality of device link profiles 134. Therefore, the pluralities of device link profiles 136 and 138 will not be described in further detail.

In an exemplary embodiment, other pluralities of device link profiles may be stored in the database 120, in addition to the pluralities of device link profiles 134, 136 and 138.

Figure 12:
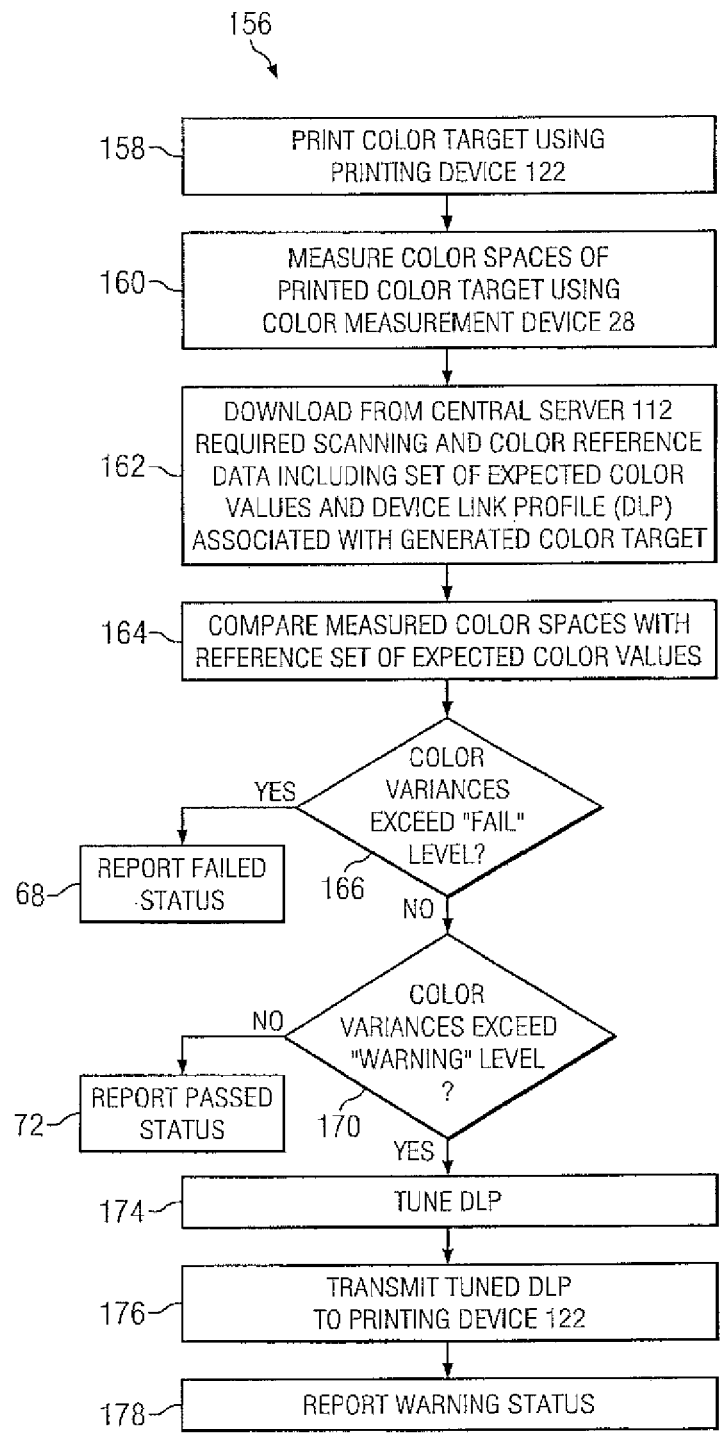
FIG. 12 is a flow chart illustration of a method of operating the system of FIG. 9, according to an exemplary embodiment.

In an exemplary embodiment, as illustrated in FIG. 12 with continuing reference to FIGS. 1-11, a method of operating the system 110 is generally referred to by the reference numeral 156. In several exemplary embodiments, the method 156 is implemented in whole or in part using one or more of the graphics job processor 12, the computing devices 22, 24, 140 and 144, the central server 112, the color measurement devices 28, 140 and 146, the printing devices 122, 126 and 130, and/or any combination thereof.

For the purpose of clarity, the method 156 will be described in connection with the printing device 122 located at the location 124, as well as the color measurement device 28 and the device link profile 134a.

As shown in FIG. 12, the method 156 includes a step 158, at which a color target is printed using the printing device 122, the color target being printed on a substrate in accordance with a client/color standard. During or after the step 158, at step 160 the color spaces of the color target printed at the step 158 are measured using the color measurement device 28. Before, during or after the step 160, at step 162 required scanning and color reference data, including a set of expected color values and a device link profile, such as the device link profile 134a, are downloaded from the central server 112. During or after the step 162, at step 164 the measured colored spaces are compared with the downloaded reference set of expected color values. During or after the step 164, at step 166 it is determined whether the color variances, that is, the variances between the measured color spaces and the downloaded reference set of expected color values, are so great so as to exceed a first set of predetermined tolerances, or a "fail" level, which specifies unacceptable variances. If so, then at step 168 a "failed" status is reported, at which point the execution of the method 156 may end. At the step 168, the "failed" status may be reported by, for example, outputting the "failed" status on the computing device 24, the printing device 122, the computing device 22, the graphics job processor 12, and/or any combination thereof.

If it is determined at the step 166 that the color variances do not exceed the first predetermined level, or the "fail" level, then at step 170 it is determined whether the color variances exceed a second set of predetermined tolerances, or a "warning" level, which is less than the first predetermined level, or "fail" level. If not, then at step 172 a "passed" status is reported, at which point the execution of the method 156 may end. At the step 172, the "passed" status may be reported by, for example, outputting the "passed" status on the computing device 24, the printing device 122, the computing device 22, the graphics job processor 12, and/or any combination thereof.

If it is determined at the step 170 that the color variances exceed the second set of predetermined tolerances, or the "warning" level, then at step 174 the device link profile 134a is adjusted or tuned, and the tuned device link profile 134a, hereafter referred to as device link profile 134a', is transmitted to the printing device 122. Before, during or after the step 174, a "warning" status is reported at step 176. At the step 176, the "warning" status may be reported by, for example, outputting the "warning" status on the computing device 24, the printing device 122, the computing device 22, the graphics job processor 12, and/or any combination thereof.

Figure 13:
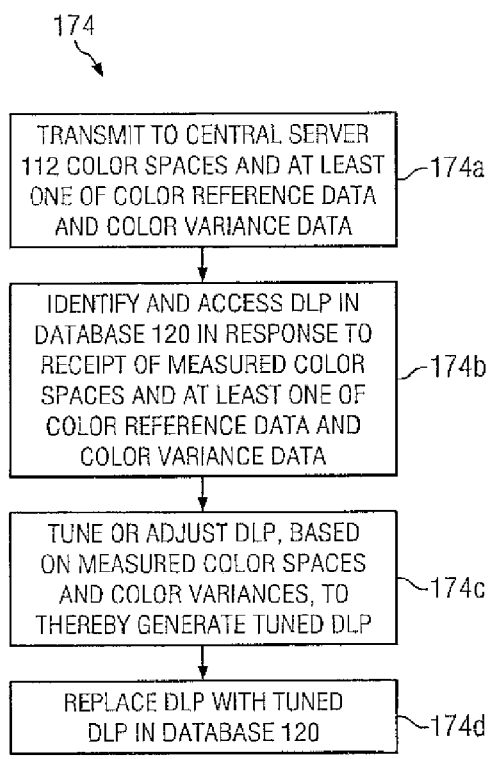
FIG. 13 is a flow chart illustration of a step of the method of FIG. 12, according to an exemplary embodiment.

In an exemplary embodiment, as illustrated in FIG. 13 with continuing reference to FIGS. 1-12, to adjust or tune the device link profile 134a at the step 174, the color spaces measured at the step 160, as well as at least one of the color reference data downloaded at the step 162 and the color variance data determined at the step 164, are transmitted from the computing device 24 to the central server 112 at step 174a. In an exemplary embodiment, at the step 174a, the color reference data downloaded at the step 162 is transmitted from the computing device 24 to the central server 112. In an exemplary embodiment, at the step 174a, the color variance data determined at the step 164 is transmitted from the computing device 24 to the central server 112. In an exemplary embodiment, at the step 174a, both the color reference data and the color variance data are transmitted from the computing device 24 to the central server 112.

At step 174b, the device link profile 134a is identified and accessed in the database 120 in response to the receipt of the measured color spaces and at least one of the color reference data and the color variance data. In an exemplary embodiment, one or more of the measured color spaces, the color reference data, and the color variance data, include one or more attributes that identify the device link profile 134a, and the central server 112 detects the one or more attributes and then identifies the device link profile 134a based on the detected one or more attributes. At step 174c, the device link profile 134a is tuned or adjusted, based on the measured color spaces and the color variances between the measured color spaces and the reference set of expected color values, thereby generating the tuned device link profile 134a'. As a result, the tuned device link profile 134a' is based on the device link profile 134a and the color variances. For example, the respective amounts of one or more of cyan, magenta, yellow and black to converted to the destination color space profile may be increased or decreased based on the measured color spaces and the color variances. For example, if it is determined at the step 170 that cyan is trending upwards and thus exceeds the "warning" level, the device link profile is adjusted or tuned at the step 174c based on this determination at the step 170, and thus the amount of cyan to be converted to the destination color space profile may be decreased or otherwise adjusted. During or after the step 174c, at step 174d the device link profile 134a is replaced with the tuned device link profile 134a' in the database 120. As a result, the tuned device profile 134a' overrides the device link profile 134a in the database 120. As a result, the tuned device link profile 134a' is associated with the printing device 122, whereas the device link profile 134a is no longer associated with the printing device 122.

In several exemplary embodiments, one or more of the steps 164, 166, 168, 170, 172, 174, 176 and 178 are executed in whole or in part using the central server 112. In several exemplary embodiments, the step 162 is omitted, only the color spaces measured at the step 160 are transmitted to the central server 112 at the step 174a, the step 174a is executed before the steps 164, 166 and 170, each of which is executed in whole or in part using the central server 112, and the steps 174b, 174c and 174d are later executed in whole or in part using the central server 112.

Figure 14:
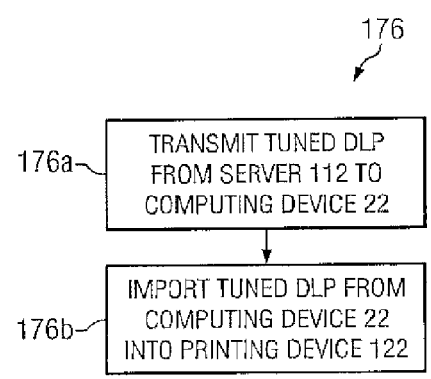
FIG. 14 is a flow chart illustration of another step of the method of FIG. 12, according to an exemplary embodiment.

In an exemplary embodiment, as illustrated in FIG. 14 with continuing reference to FIGS. 1-13, to transmit the tuned device link profile 134a' to the printing device 122 at the step 176, at step 176a the tuned device link profile 134a' is transmitted from the central server 112 to the computing device 22 via the network 26. During or after the step 176a, at step 176b the tuned device link profile 134a' is imported from the computing device 22 into the printing device 122. In an exemplary embodiment, an operator detects the transmission of the tuned device link profile 134a' to the computing device 22 at the step 176a, and at step 176b manually imports the tuned device link profile 134a' from a folder stored on the computing device 22 into the printing device 122 using, for example, a digital front end (DFE) interface associated with the printing device 122. The tuned device link profile 134a' overrides the device link profile 134 in the DFE. In an exemplary embodiment, at the step 176b the computing device 22 automatically pushes the tuned device link profile 134a' directly to the printing device 122. In an exemplary embodiment, at the step 176b the computing device 22 automatically pushes the tuned device link profile 134a' directly into a DFE associated with the printing device 122. In an exemplary embodiment, a DFE associated with the printing device 122 watches for the tuned device link profile 134a' by, for example, issuing a query for any and all tuned device link profiles, including the tuned device link profile 134a', either periodically or in response to a trigger event.

Although the execution of the method 156 has been described above in connection with the device link profile 134a, the method 156 may be executed to tune any of the other device link profiles in the plurality of device link profiles 134, including the device link profile 134b or 134c, or any other device link profiles the location identifiers 150 of which identify the location 124, and the device identifiers 152 of which identify the printing device 122.

Although the execution of the method 156 has been described above in connection with the location 124 and the printing device 122 located thereat, as well as with the computing devices 22 and 24 and the color measurement device 28, the method may be executed to tune any of the other device link profiles stored in the database 120, the location identifiers 150 of which identify the location 128 and the device identifiers 152 of which identify the printing device 126, and thus the method 156 may be executed using the computing device 144 and/or another computing device instead of the computing device 22, using the computing device 144 instead of the computing device 24, and using the color measurement device 146 instead of the color measurement device 28.

Although the execution of the method 156 has been described above in connection with the location 124 and the printing device 122 located thereat, as well as with the computing devices 22 and 24 and the color measurement device 28, the method may be executed to tune any of the other device link profiles stored in the database 120, the location identifiers 150 of which identify the location 132 and the device identifiers 152 of which identify the printing device 130, and thus the method 156 may be executed using the computing device 140 and/or another computing device instead of the computing device 22, using the computing device 140 instead of the computing device 24, and using the color measurement device 142 instead of the color measurement device 28.

In according with the foregoing description, in several exemplary embodiments, as a result of the method 156, visibility and consistency of color management across multiple site locations is allowed. In an exemplary embodiment, the central server 112 is "in the cloud" and the central server 112 and/or the computer readable medium 116 hold information such as device link profile naming, client, device information, chart controls and calibration alerts, substrates and reporting. In an exemplary embodiment, in accordance with the method 156, print job(s) are submitted through job processing software using the graphics job processor 12, or the computing device 24, 140 or 144, and transmitted to the printing device 122, 126 or 130. In an exemplary embodiment, in accordance with the method 156, an inline or near line spectrophotometer reading is transmitted to the central server 112 and compared against predetermined criteria related to the print job(s). In an exemplary embodiment, in accordance with the method 156, this comparison and/or constant measurement is carried to other device link profiles and verified for those device link profiles, which as a result are calibrated and ready to run. In an exemplary embodiment, in accordance with the method 156, the central server 112 calibrates, recalibrates or sends recalibration to, or stops, the printing device 122, 126 or 130, thereby making adjustments as needed. In an exemplary embodiment, the method 156 can be used across departments such as digital, inkjet web, grand format, and offset.

Figure 15:
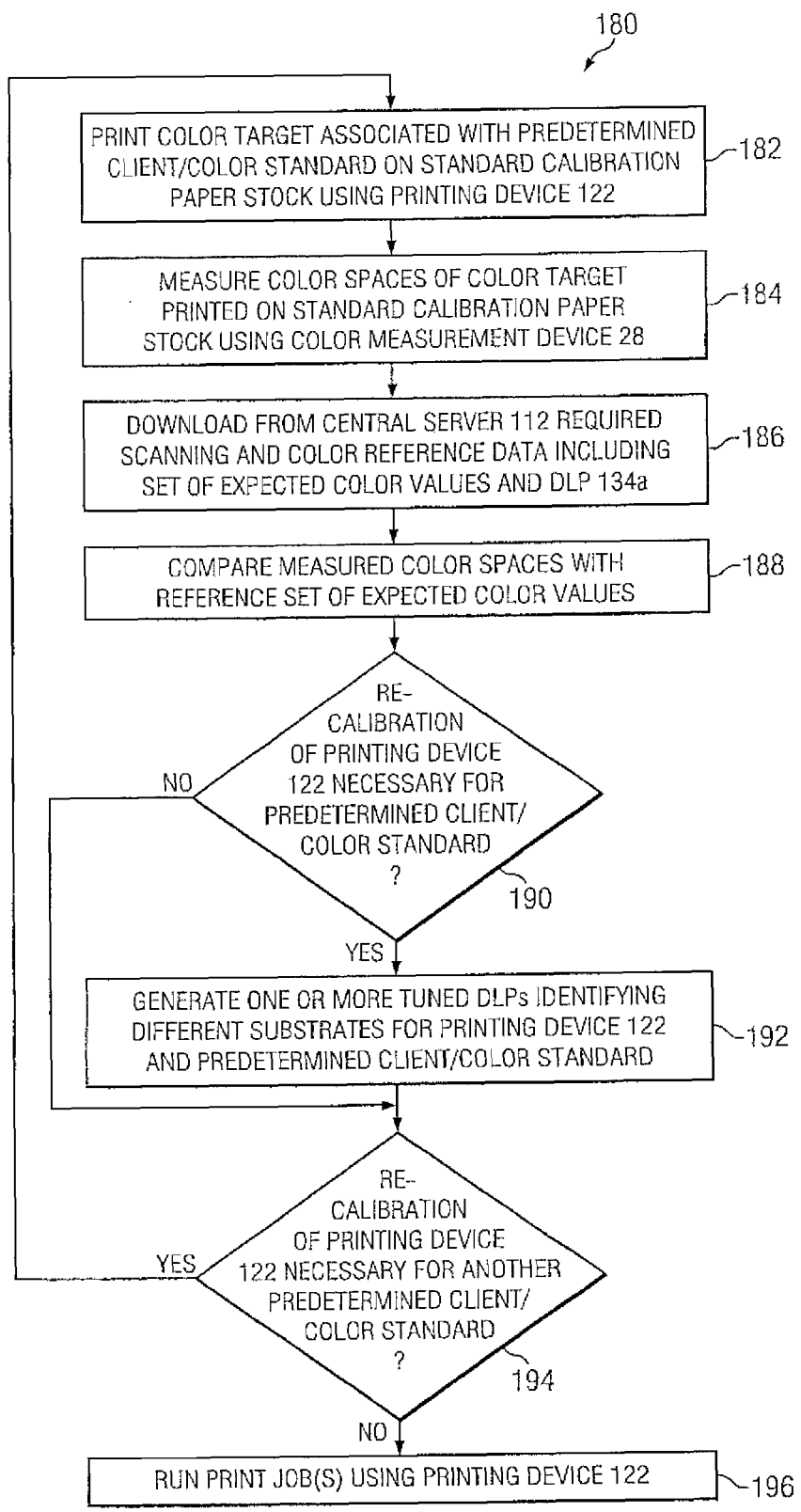
FIG. 15 is a flow chart illustration of another method of operating the system of FIG. 9, according to an exemplary embodiment.

In an exemplary embodiment, as illustrated in FIG. 15 with continuing reference to FIGS. 1-14, another method of operating the system 110 is generally referred to by the reference numeral 180. In several exemplary embodiments, the method 180 is implemented in whole or in part using one or more of the graphics job processor 12, the computing devices 22, 24, 140 and 144, the central server 112, the color measurement devices 28, 140 and 146, the printing devices 122, 126 and 130, and/or any combination thereof.

In accordance with the following description, in several exemplary embodiments, as a result of the method 180, calibration is not conducted on a per-printing stock basis, but instead is conducted on a much simpler per-printing device basis.

For the purpose of clarity, the method 180 will be described in connection with the printing device 122 located at the location 124, the computing device 24, the color measurement device 28, and the device link profile 134.

As shown in FIG. 15, the method 180 includes a step 182, at which a color target associated with a predetermined client/color standard is printed on standard calibration paper stock using the printing device 122. During or after the step 182, at step 184 the color spaces of the color target printed at the step 182 are measured using the color measurement device 28. Before, during or after the step 184, at step 186 required scanning and color reference data are downloaded to the computing device 24, the required scanning and color reference data including a set of expected color values and the device link profile 134a. The location identifier 150 of the device link profile 134a identifies the location 124. The device identifier 152 of the device link profile 134a identifies the printing device 122. The substrate identifier 153 of the device link profile 134a identifies the standard calibration paper stock on which the color target printed at the step 182. The client/color standard identifier 154 of the device link profile 134a identifies the predetermined client/color standard with which the color target printed at the step 182 is associated. In an exemplary embodiment, at the step 186, instead of, or in addition to, the computing device 24, the required scanning and color reference data are downloaded to the computing device 22.

During or after the step 186, at step 188 the color spaces measured at the step 184 are compared with the reference set of expected color values downloaded at the step 186. In an exemplary embodiment, the comparison is made at the step 188 by executing a computer program using the computing device 24 and/or the computing device 22. During or after the step 188, at step 190 it is determined whether recalibration of the printing device 122 is necessary for the predetermined client/color standard. In an exemplary embodiment, at the step 190, it is determined whether the color variances, that is, the variances between the measured color spaces and the downloaded reference set of expected color values, are so great so as to exceed a set of predetermined tolerances. If the variances are so great, then it is determined at the step 190 that recalibration of the printing device 122 is necessary.

If it is determined at the step 190 that recalibration of the printing device 122 is necessary, then at step 192 one or more tuned device link profiles identifying different substrates are generated for the printing device 122 and the predetermined client/color standard, the one or more tuned device link profiles including the tuned device link profile 134a'.

Before, during or after the step 192, or if it is determined at the step 190 that recalibration of the printing device 122 is not necessary for the predetermined client/color standard, then at step 194 it is determined whether recalibration of the printing device 122 may be necessary for another predetermined client/color standard. In an exemplary embodiment, such a recalibration may be determined to be necessary at the step 190 if a plurality of print jobs are to be run using the printing device 122, and the print jobs are to be run with different client/color standards.

Before, during or after the step 194, at step 196 one or more color print jobs are run using the printing device 122, with the one or more print jobs calling for the predetermined client/color standard(s) associated with the color target(s) printed at the step 182. As shown in FIG. 15, before or during the step 196, the steps 182, 184, 186, 188, 190, 192 and 194 may have been executed only once because only a single client/color standard is called for at the step 196, or may have been executed multiple times because multiple client/color standards are called for at the step 196.

Figure 16:
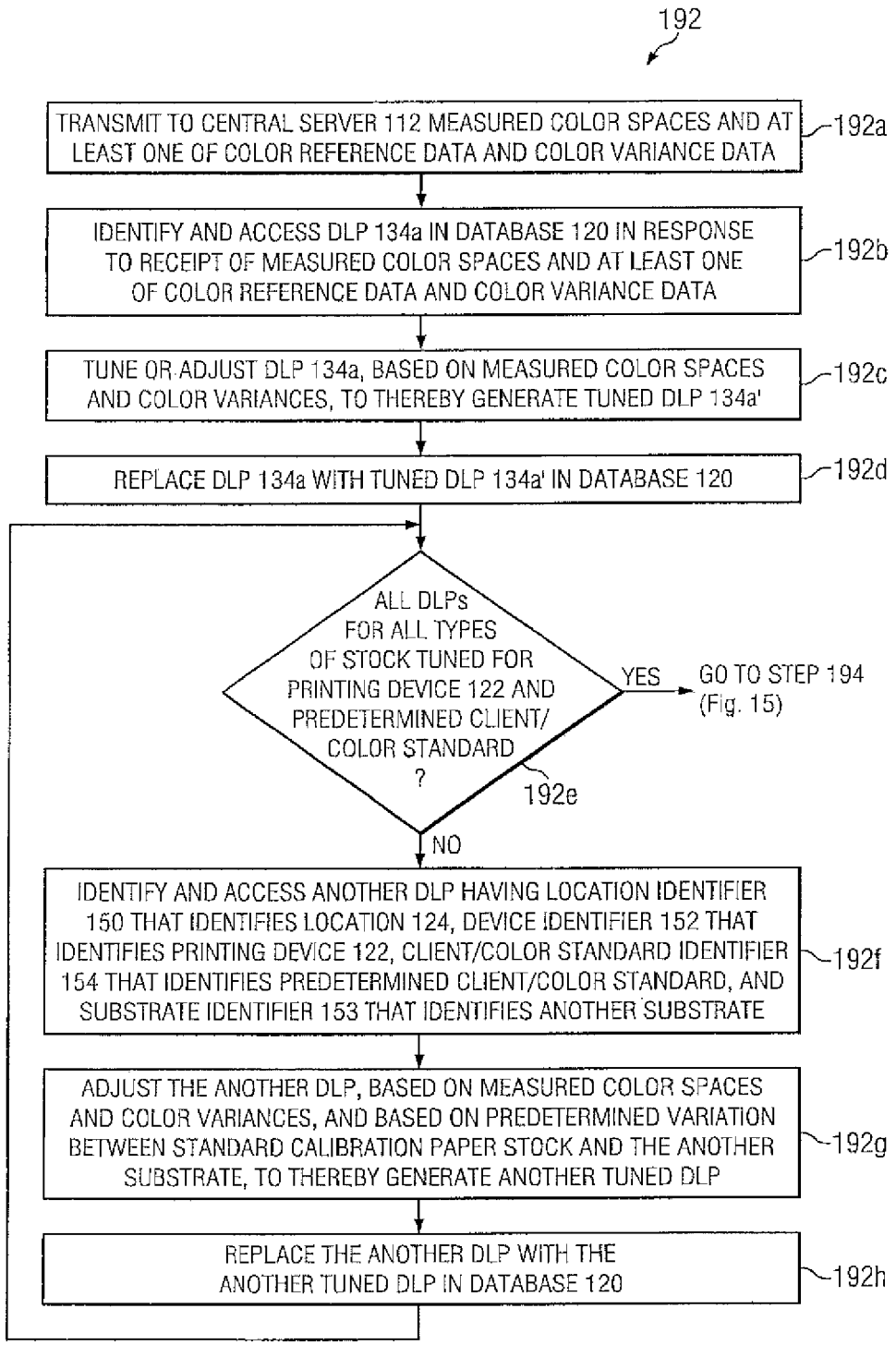
FIG. 16 is a flow chart illustration of a step of the method of FIG. 15, according to an exemplary embodiment.

In an exemplary embodiment, as illustrated in FIG. 16 with continuing reference to FIGS. 1-15, to generate the one or more tuned device link profiles (including the tuned device link profile 134a') at the step 192, the color spaces measured at the step 184, as well as at least one of the color reference data downloaded at the step 186 and the color variance data determined at the step 188, are transmitted from the computing device 24 to the central server 112 at step 192a. In an exemplary embodiment, at the step 192a, the color reference data downloaded at the step 186 is transmitted from the computing device 24 to the central server 112. In an exemplary embodiment, at the step 192a, the color variance data determined at the step 188 is transmitted from the computing device 24 to the central server 112. In an exemplary embodiment, at the step 192a, both the color reference data and the color variance data are transmitted from the computing device 24 to the central server 112.

At step 192b, the device link profile 134a is identified and accessed in response to the receipt of the measured color spaces and at least one of the color reference data and the color variance data. In an exemplary embodiment, at the step 192b, one or more of the measured color spaces, the color reference data, and the color variance data, include one or more attributes that identify the device link profile 134a, and the central server 112 detects the one or more attributes and then identifies the device link profile 134a based on the detected one or more attributes. At step 192c, the device link profile 134a is tuned or adjusted, based on the measured color spaces and the color variances between the measured color spaces and the reference set of expected color values, thereby generating the tuned device link profile 134a'. For example, the respective amounts of one or more of cyan, magenta, yellow and black to be converted to the destination color space profile may be increased or decreased based on the measured color spaces and the color variances. For example, if it is determined at the step 190 that cyan is trending upwards and thus the variance thereof exceeds a predetermined level or tolerance, the device link profile is adjusted or tuned at the step 192c based on this determination at the step 190, and thus the amount of cyan to be converted to the destination color space profile may be decreased or otherwise adjusted. During or after the step 192c, at step 192d the device link profile 134a is replaced with the tuned device link profile 134a'. In several exemplary embodiments, the steps 192a through 192d of the step 192 of the method 180 are substantially identical to the steps 174a through 174d, respectively, of the step 174 of the method 156.

Before, during or after the step 192d, it is determined at step 192e whether all device link profiles for all types of substrate or printing stock have been tuned for the printing device 122 and the predetermined client/color standard associated with the color target printed at the step 182. If so, then the step 192 is completed and the step 194 is executed in accordance with the foregoing. In several exemplary embodiments, the step 194 is executed before, during or after the step 192.

If at the step 192e it is determined that all device link profiles for all types of printing stock have not been tuned for the printing device 122 and the predetermined client/color standard associated with the color target printed at the step 182, then at step 192f another device link profile is identified and accessed in the database 120, the location identifier 150 of which identifies the location 124, the device identifier 152 of which identifies the printing device 122, the client/color standard identifier 154 of which identifies the predetermined client/color standard, and the substrate identifier 153 of which identifies another substrate, i.e., a substrate other than the substrate on which the color target was printed at the step 182, namely standard calibration paper stock. At step 192g, this another device link profile identified at the step 192f is tuned or adjusted, based on (a) the measured color spaces and the color variances between the measured color spaces and the reference set of expected color values, and (b) the predetermined variation between (i) the another substrate identified by the substrate identifier 153 of the another device link profile and (ii) the standard calibration paper stock on which the color target was printed at the step 182, thereby generating another tuned device link profile.

For example, if it is determined at the step 190 that cyan is trending upwards and thus the variance thereof exceeds a predetermined level, the device link profile is adjusted or tuned at the step 192c based on this determination at the step 190, as well as based on the predetermined variance between standard calibration paper stock and the another substrate. That is, if cyan is decreased by a predetermined amount for standard calibration paper stock, then cyan is further adjusted (decreased or increased) to take in account the known differences in the cyan requirement between standard calibration paper stock and the another substrate.

During or after the step 192g, at step 192h the another device link profile identified at the step 192f is replaced with the another tuned device link profile generated at the step 192g.

The steps 192e, 192f, 192g and 192h are repeated until it is determined at the step 192e that all device link profiles for all types of printing stock have been tuned for the printing device 122 and the predetermined client/color standard associated with the color target printed at the step 182.

Figure 17:
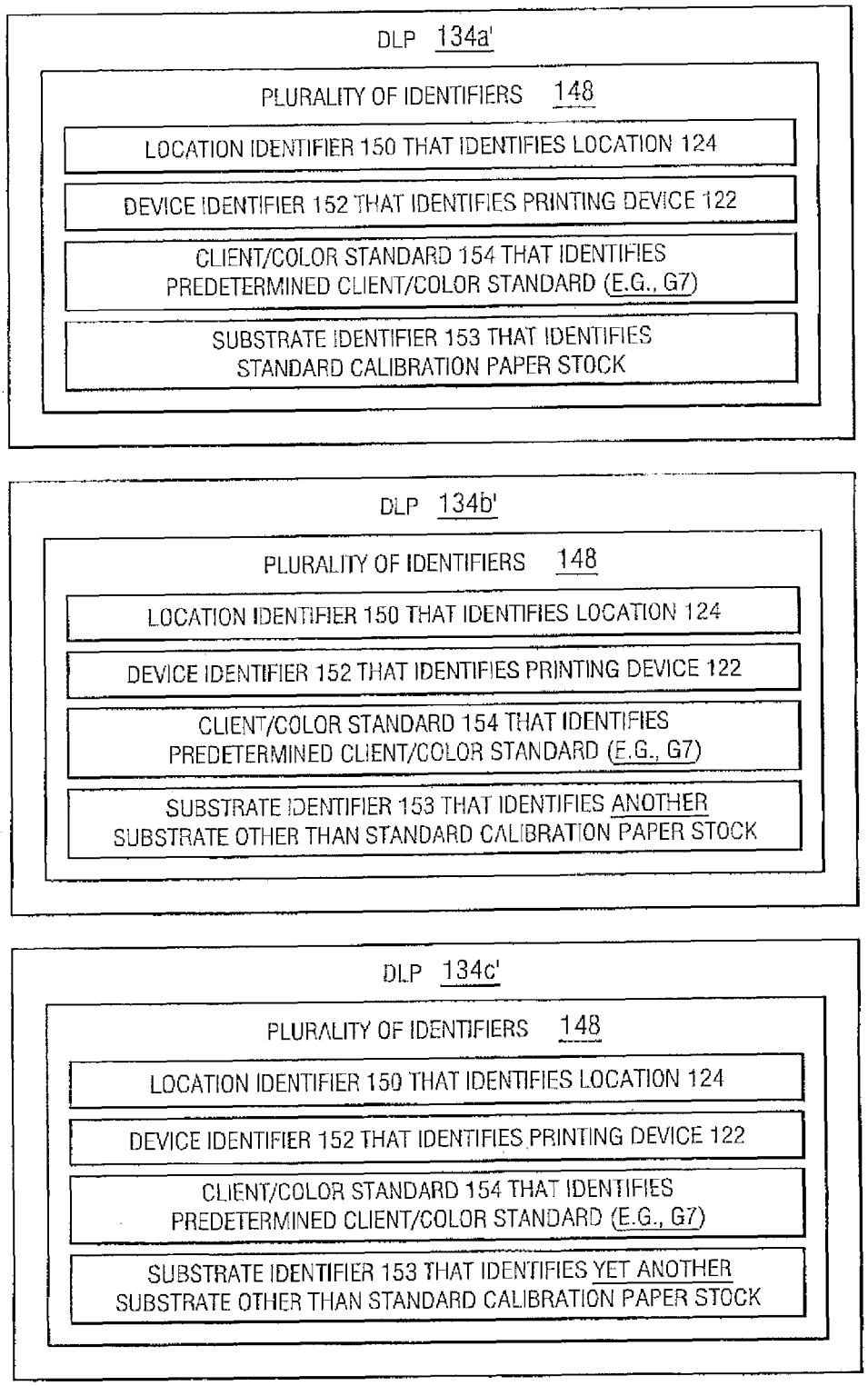
FIG. 17 contains diagrammatic illustrations of tuned versions of the device link profiles of FIG. 10, according to an exemplary embodiment.

In an exemplary embodiment, as illustrated in FIG. 17 with continuing reference to FIGS. 1-16, a plurality of tuned device link profiles includes tuned device link profiles 134a', 134b' and 134c', which are tuned versions of the device link profiles 134a, 134b and 134c, respectively, of FIG. 10. As shown in FIG. 17, each of the tuned device link profiles 134a', 134b' and 134c' includes a respective one of the plurality of identifiers 148, which includes the location identifier 150 that identifies the location 124, the device identifier 152 that identifies the printing device 122, the client color/standard identifier 154 that identifies the predetermined client/color standard associated with the color target printed at the step 182. However, each of the respective ones of the substrate identifiers 153 of the tuned device link profiles 134a', 134b' and 134c' identifies a different substrate, with the substrate identifier 153 of the tuned device link profile 134a' identifying standard calibration paper stock, the substrate identifier 153 of the tuned device link profile 134b' identifying another substrate other than standard calibration paper stock, and the substrate identifier 153 of the tuned device link profile 134c' identifying yet another substrate other than standard calibration paper stock. In several exemplary embodiments, the tuned device link profile 134a' is generated at the step 192c of the step 192 of the method 180, the tuned device link profile 134b' is generated at one execution of the step 192g of the step 192 of the method 180, and the tuned device link profile 134c' is generated at a repeat execution of the step 192g of the step 192 of the method 180.

In an exemplary embodiment, as illustrated in FIG. 18 with continuing reference to FIGS. 1-17, a plurality of tuned device link profiles includes tuned device link profiles 136a', 136b' and 136c', which are tuned versions of respective device link profiles of the plurality of device link profiles 136. As shown in FIG. 18, each of the tuned device link profiles 136a', 136b' and 136c' includes a respective one of the plurality of identifiers 148, which includes the location identifier 150 that identifies the location 124, the device identifier 152 that identifies the printing device 122, the client color/standard identifier 154 that identifies a predetermined client/color standard other than the predetermined client/color standard associated with the color target printed at the step 182. However, each of the respective ones of the substrate identifiers 153 of the tuned device link profiles 136a', 136b' and 136c' identifies a different substrate, with the substrate identifier 153 of the tuned device link profile 136a' identifying standard calibration paper stock, the substrate identifier 153 of the tuned device link profile 136b' identifying another substrate other than standard calibration paper stock, and the substrate identifier 153 of the tuned device link profile 136c' identifying yet another substrate other than standard calibration paper stock. In several exemplary embodiments, the tuned device link profiles 136a', 136b' and 136c' are generated after the generation of the tuned device link profiles 134a', 134b' and 134c'. In several exemplary embodiments, the tuned device link profiles 136a', 136b' and 136c' are generated as a result of a repeat execution of the steps 182, 184, 186, 188, 190 and 192. More particularly, if it is determined at the step 194 that recalibration of the printing device 122 is necessary for another predetermined client/color standard (e.g., ICC CMYK), and thus the steps 182, 184, 186, 188, 190 and 192 are repeated, with the tuned device link profile 136a' (instead of 134a') being generated at the step 192c of the step 192 of the method 180, with the tuned device link profile 136b' (instead of 134b') being generated at the step 192g of the step 192 of the method 180, and the tuned device link profile 136c' (instead of 134c') being generated at a repeat execution of the step 192g of the step 192 of the method 180.

Although the execution of the method 180 has been described above in connection with the pluralities of device link profiles 134 and 136, the method 180 may be executed to tune other pluralities of device link profiles including, for example, the plurality of device link profiles 138, or any other device link profiles the location identifiers 150 of which identify the location 124, and the device identifiers 152 of which identify the printing device 122.

Although the execution of the method 180 has been described above in connection with the location 124 and the printing device 122 located thereat, as well as with the computing devices 22 and 24 and the color measurement device 28, the method 180 may be executed to recalibrate the printing device 126, and thus the method 180 may be executed using the computing device 144 and/or another computing device instead of the computing device 22, using the computing device 144 instead of the computing device 24, and using the color measurement device 146 instead of the color measurement device 28.

Although the execution of the method 180 has been described above in connection with the location 124 and the printing device 122 located thereat, as well as with the computing devices 22 and 24 and the color measurement device 28, the method 180 may be executed to recalibrate the printing device 130, and thus the method 180 may be executed using the computing device 140 and/or another computing device instead of the computing device 22, using the computing device 140 instead of the computing device 24, and using the color measurement device 142 instead of the color measurement device 28.

In according with the foregoing description, in several exemplary embodiments, as a result of the method 180, calibration is not conducted on a per-printing stock basis, but instead is conducted on a much simpler per-printing device basis. In several exemplary embodiments, the method 180 focuses on a particular printing device (e.g., the printing device 122, 126 or 130) for calibration, instead of focusing on a particular type of printing stock for calibration. The method 180 contemplates that since calibration for one type of printing stock (e.g., standard calibration paper stock) can be completed, and it is known how another type of printing stock is going to vary colormetrically from the first-mentioned paper stock (e.g., standard calibration paper stock), then this variance is applied as a known value at the step 192g. In several exemplary embodiments, as a result of the method 180, a given printing device, such as the printing device 122, 126 or 130, does not have to be recalibrated every time different printing stock is used for a print job. In several exemplary embodiments, as a result of the method 180, an operator does not have to pre-load or calibrate every time a given printing stock is used by the printing device 122, 126 or 120; instead, the corresponding device link profile for the given printing stock is already pre-calibrated.

In accordance with the foregoing, in several exemplary embodiments, the method 180 includes running spectral swatches on standard calibration stock (see, e.g., the step 182), reading spectral data (see, e.g., the step 184), determining whether a given printing device should be recalibrated based on the spectral data readings (see, e.g., the steps 186, 188 and 190) and, if so, creating all new device link profiles for the given printing device (see, e.g., the step 192) and inserting new or tuned device link profiles for all substrates based on known variances between the substrates and the standard calibration stock (see, e.g., the steps 192d and 192h), and running print job(s) (see, e.g., the step 196).

Figure 19:
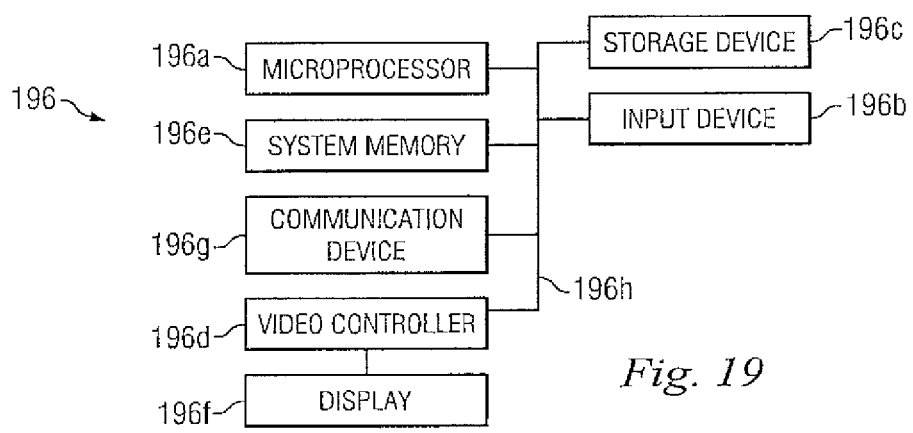
FIG. 19 is a diagrammatic illustration of a node for implementing one or more exemplary embodiments of the present disclosure, according to an exemplary embodiment.

In an exemplary embodiment, as illustrated in FIG. 19 with continuing reference to FIGS. 1-18, an illustrative node 196 for implementing one or more embodiments of one or more of the above-described networks, elements, methods and/or steps, and/or any combination thereof, is depicted. The node 196 includes a processor 196a, an input device 196b, a storage device 196c, a video controller 196d, a system memory 196e, a display 196f, and a communication device 196g, all of which are interconnected by one or more buses 196h. In several exemplary embodiments, the storage device 196c may include a floppy drive, hard drive, CD-ROM, optical drive, any other form of storage device and/or any combination thereof. In several exemplary embodiments, the storage device 196c may include, and/or be capable of receiving, a floppy disk, CD-ROM, DVD-ROM, or any other form of computer readable medium that may contain executable instructions. In several exemplary embodiments, the communication device 196g may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, smartphones and cell phones.

In exemplary embodiments, one or more of the graphics job processor 12, the computing devices 22, 24, 140 and 144, the color measurement devices 28, 142 and 146, the digital front ends 30, 42 and 44, the digital color presses 36a, 36b, 36c, 36d, 38 and 40, the printing devices 122, 126 and 130, the inline color measurement device 94, the central server 112, and/or one or more components thereof, is, or at least includes, the node 196 and/or components thereof, and/or one or more nodes that are substantially similar to the node 196 and/or components thereof. In several exemplary embodiments, one or more of the above-described components of one or more of the node 196, the graphics job processor 12, the computing devices 22 and 24, the color measurement device 28, the digital front ends 30, 42 and 44, the digital color presses 36a, 36b, 36c, 36d, 38 and 40, the inline color measurement device 94, and/or one or more components thereof, include respective pluralities of same components.

In exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In exemplary embodiments, the network 26, and/or one or more portions thereof, may be designed to work on any specific architecture. In an exemplary embodiment, one or more portions of the network 26 may be executed on a single computer, local area networks, client-server networks, wide area networks, internets, hand-held and other portable and wireless devices and networks.

In exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In exemplary embodiments, a computer program, such as a plurality of instructions stored on a computer readable medium, such as one or more of the computer readable medium 16, the database 20, the computer readable medium 22b, the computer readable medium 34, the computer readable medium 116, the database 120, the system memory 196e, and/or any combination thereof, may be executed by a processor to cause the processor to carry out or implement in whole or in part the operation of one or both of the systems 10 and 110, one or more of the methods 52, 76, 96, 156, 180 and/or any combination thereof. In several exemplary embodiments, such a processor may include one or more of the processor 18, the processor 22a, the processor 32, the processor 118, the processor 196a, and/or any combination thereof. In several exemplary embodiments, such a processor may execute the plurality of instructions in connection with a virtual computer system.

In exemplary embodiments, a printing device may be dynamically color tuned on-the-fly without suspending printing operations. In exemplary embodiments, an acceptable range of color variation is identified for a particular printing device or printing job, and the color tuning as disclosed herein is implemented before any drift in color variation extends outside the acceptable range.

A method has been described that includes generating a color target, wherein the color target is associated with a print job; specifying an interval at which to print the color target; executing the print job; and during the execution of the print job, automatically printing the color target at the specified interval. In an exemplary embodiment, the specified interval is based on at least one of the following: a time interval, a sheet count interval, and a product type. In an exemplary embodiment, automatically printing the color target at the specified interval during the execution of the print job includes determining whether the print job is at the specified interval; if the print job is at the specified interval, then automatically transmitting the color target to a digital front end; and automatically printing the color target to a proof tray of a digital color press, wherein the digital color press is at least partially controlled by the digital front end. In an exemplary embodiment, the color target has one or more color spaces; and wherein the method further includes measuring the one or more color spaces; and generating a report on color stability based on the measurements of the one or more color spaces. In an exemplary embodiment, the color target has one or more color spaces; wherein the digital color press includes a color measurement device; and wherein the method further includes automatically measuring the one or more color spaces using the color measurement device; automatically comparing the measurements of the one or more color spaces with a reference set of color values to thereby determine one or more color variances; determining whether the one or more color variances are within respective tolerances; and if the one or more color variances are not within the respective tolerances, then automatically adjusting the digital color press.

An apparatus has been described that includes a computer readable medium; and a plurality of instructions stored on the computer readable medium, wherein the plurality of instructions are executable by a processor, and wherein the plurality of instructions includes instructions that cause the processor to generate a color target, wherein the color target is associated with a print job; instructions that cause the processor to specify an interval at which to print the color target; instructions that cause the processor to execute the print job; and instructions that cause the processor, during the execution of the print job, to automatically print the color target at the specified interval. In an exemplary embodiment, the specified interval is based on at least one of the following: a time interval, a sheet count interval, and a product type. In an exemplary embodiment, instructions that cause the processor, during the execution of the print job, to automatically print the color target at the specified interval include instructions that cause the processor to determine whether the print job is at the specified interval; instructions that, if the print job is at the specified interval, cause the processor to automatically transmit the color target to a digital front end; and automatically print the color target to a proof tray of a digital color press, wherein the digital color press is at least partially controlled by the digital front end. In an exemplary embodiment, the color target has one or more color spaces; and wherein the plurality of instructions further includes instructions that cause the processor to measure the one or more color spaces; and instructions that cause the processor to generate a report on color stability based on the measurements of the one or more color spaces. In an exemplary embodiment, the color target has one or more color spaces; wherein the digital color press includes a color measurement device; and wherein the plurality of instructions further includes instructions that cause the processor to automatically measure the one or more color spaces using the color measurement device; instructions that cause the processor to automatically compare the measurements of the one or more color spaces with a reference set of color values to thereby determine one or more color variances; instructions that cause the processor to determine whether the one or more color variances are within respective tolerances; and instructions that, if the one or more color variances are not within the respective tolerances, cause the processor to automatically adjust the digital color press.

A system has been described that includes a server; a digital front end in communication with the server; a digital color press at least partially controlled by the digital front end, the digital color press comprising a stacker to which sheets of a print job are adapted to be printed during the execution of the print job; and a proof tray to which a color target is adapted to be printed, wherein the color target is associated with the print job; a processor, wherein the processor is part of at least one of the server, the digital front end, and the digital color press; and a computer program executable by the processor and stored in at least one of the server, the digital front end, and the digital color press, wherein the computer program, when executed by the processor, causes the color target to be printed to the proof tray during the execution of the print job. In an exemplary embodiment, the color target is automatically printed to the proof tray at a specified interval during the execution of the print job. In an exemplary embodiment, the system further includes a user interface, wherein the color target is generated using the user interface during the execution of the print job. In an exemplary embodiment, the color target has one or more color spaces; and wherein the system further includes a color measurement device adapted to measure the one or more color spaces. In an exemplary embodiment, the color measurement device is part of the digital color press; and wherein the one or more color spaces are automatically measured using the color measurement device during the execution of the print job.

A method has been described that includes receiving data corresponding to a print job; executing the print job using a digital color press, including printing sheets of the print job to a stacker of the digital color process; generating a color target, wherein the color target is based on the received data; transmitting the color target to a digital front end, wherein the digital front end at least partially controls the digital color press; and printing the color target to a proof tray of the digital color press during the execution of the print job. In an exemplary embodiment, the color target has one or more color spaces; and wherein the method further includes measuring the one or more color spaces; and generating a report on color stability based on the measurements of the one or more color spaces. In an exemplary embodiment, the color target has one or more color spaces; wherein the digital color press includes a color measurement device; and wherein the method further includes automatically measuring the one or more color spaces using the color measurement device; automatically comparing the measurements of the one or more color spaces with a reference set of color values to thereby determine one or more color variances; determining whether the one or more color variances are within respective tolerances; and if the one or more color variances are not within the respective tolerances, then automatically adjusting the digital color press. In an exemplary embodiment, the color target is generated using a user interface during the execution of the print job. In an exemplary embodiment, printing the color target to the proof tray of the digital color press during the execution of the print job includes specifying an interval at which to print the color target, wherein the specified interval is based on at least one of the following: a time interval, a sheet count interval, and a product type; during the execution of the print job, determining whether the print job is at the specified interval; during the execution of the print job, if the print job is at the specified interval, then automatically transmitting the color target to a digital front end; and automatically printing the color target to the proof tray of the digital color press, wherein the digital color press is at least partially controlled by the digital front end.

An apparatus has been described that includes a computer readable medium; and a plurality of instructions stored on the computer readable medium, wherein the plurality of instructions are executable by a processor, and wherein the plurality of instructions includes instructions that cause the processor to receive data corresponding to a print job; instructions that cause the processor to execute the print job using a digital color press, including printing sheets of the print job to a stacker of the digital color process; instructions that cause the processor to generate a color target, wherein the color target is based on the received data; instructions that cause the processor to transmit the color target to a digital front end, wherein the digital front end at least partially controls the digital color press; and instructions that cause the processor to print the color target to a proof tray of the digital color press during the execution of the print job. In an exemplary embodiment, the color target has one or more color spaces; and wherein the plurality of instructions further includes instructions that cause the processor to measure the one or more color spaces; and instructions that cause the processor to generate a report on color stability based on the measurements of the one or more color spaces. In an exemplary embodiment, the color target has one or more color spaces; wherein the digital color press includes a color measurement device; and wherein the plurality of instructions further includes instructions that cause the processor to automatically measure the one or more color spaces using the color measurement device; instructions that cause the processor to automatically compare the measurements of the one or more color spaces with a reference set of color values to thereby determine one or more color variances; instructions that cause the processor to determine whether the one or more color variances are within respective tolerances; and instructions that, if the one or more color variances are not within the respective tolerances, cause the processor to automatically adjust the digital color press. In an exemplary embodiment, instructions that cause the processor to print the color target to the proof tray of the digital color press during the execution of the print job include instructions that cause the processor to specify an interval at which to print the color target, wherein the specified interval is based on at least one of the following: a time interval, a sheet count interval, and a product type; instructions that, during the execution of the print job, cause the processor to determine whether the print job is at the specified interval; instructions that, during the execution of the print job and if the print job is at the specified interval, cause the processor to automatically transmit the color target to a digital front end; and automatically print the color target to the proof tray of the digital color press, wherein the digital color press is at least partially controlled by the digital front end.

A method has been described that includes measuring one or more color spaces of a first color target; comparing the measurements of the one or more color spaces with a first reference set of color values to thereby determine one or more color variances; determining whether the one or more color variances are within their respective tolerances; and if the one or more color variances are not within their respective tolerances, then: identifying, using at least one of the measurements of the one or more color spaces, the first reference set of color values, and the one or more color variances, a first device link profile associated with a first printing device; generating a second device link profile associated with the first printing device, wherein the second device link profile is based on at least the first device link profile and the one or more color variances; and associating the second device link profile with the first printing device so that the first device link profile is no longer associated with the first printing device. In an exemplary embodiment, the first printing device is selected from the group consisting of a digital color press, an inkjet web press device, a grand format printing press device, and a digital offset press. In an exemplary embodiment, the first printing device is positioned at a first location; and wherein the method further comprises transmitting at least the measurements of the one or more color spaces to a second location that is different from the first location; and transmitting the second device link profile to the first printing device from a third location that either is the same as the second location, or is different than each of the first and second locations. In an exemplary embodiment, the first color target is printed on a first substrate in accordance with a first color standard using the first printing device; and wherein each of the first and second device link profiles comprises a plurality of identifiers, the plurality of identifiers comprising a first device identifier that identifies the first printing device; a first substrate identifier that identifies the first substrate; and a first color standard identifier that identifies the first color standard. In an exemplary embodiment, transmitting at least the measurements of the one or more color spaces to the second location comprises transmitting at least the measurements to a central server located at the second location, the central sever comprising a processor; wherein identifying the first device link profile comprises using the central server to identify the first device link profile in a database accessible to the processor; wherein generating the second device link profile comprises using the central server to generate the second device link profile; and wherein associating the second device link profile with the first printing device so that the first device link profile is no longer associated with the first printing device comprises replacing the first device link profile with the second device link profile in the database. In an exemplary embodiment, the first device link profile is part of a first plurality of device link profiles associated with the first printing device before the second device link profile is associated with the first printing device; wherein the second device link profile is part of the first plurality of device link profiles, and the first device link profile is not part of the first plurality of device link profiles, after the second device link profile is associated with the first printing device. In an exemplary embodiment, the first color target is printed on a first substrate in accordance with a first color standard using the first printing device; wherein each of the first and second device link profiles comprises a first plurality of identifiers, the first plurality of identifiers comprising a first device identifier that identifies the first printing device; a first color standard identifier that identifies the first color standard; and a first substrate identifier that identifies the first substrate; and wherein the method further comprises identifying a third device link profile associated with the first printing device, the third device link profile comprising a second plurality of identifiers, the second plurality of identifiers comprising a second device identifier that identifies the first printing device; a second color standard identifier that identifies the first color standard; and a second substrate identifier that identifies a second substrate that is different than the first substrate; generating a fourth device link profile associated with the first printing device, wherein the fourth device link profile is based on at least: the third device link profile, the one or more color variances, and a predetermined first variation between the first and second substrates, wherein the predetermined first variation between the first and second substrates is based on at least the first color standard; and associating the fourth device link profile with the first printing device so that the third device link profile is no longer associated with the first printing device. In an exemplary embodiment, the method comprises measuring one or more color spaces of a second color target, wherein the second color target is printed on the first substrate in accordance with a second color standard using the first printing device; comparing the measurements of the one or more color spaces of the second color target with a second reference set of color values to thereby determine one or more other color variances; determining whether the one or more other color variances are within their respective tolerances; and if the one or more other color variances are not within their respective tolerances, then: identifying, using at least one of the measurements of the one or more color spaces of the second color target, the second reference set of color values, and the one or more other color variances, a fifth device link profile associated with the first printing device, the fifth device link comprising a third plurality of identifiers, the third plurality of identifiers comprising a third device identifier that identifies the first printing device; a third color standard identifier that identifies the second color standard; and a third substrate identifier that identifies the first substrate; generating a sixth device link profile associated with the first printing device, wherein the sixth device link profile is based on at least the fifth device link profile and the one or more other color variances; associating the sixth device link profile with the first printing device so that the fifth device link profile is no longer associated with the first printing device; identifying a seventh device link profile associated with the first printing device, the seventh device link profile comprising a fourth plurality of identifiers, the fourth plurality of identifiers comprising a fourth device identifier that identifies the first printing device; a fourth color standard identifier that identifies the second color standard; and a fourth substrate identifier that identifies the second substrate; generating an eighth device link profile associated with the first printing device, wherein the eighth device link profile is based on at least: the seventh device link profile, the one or more other color variances, and a predetermined second variation between the first and second substrates, wherein the predetermined second variation between the first and second substrates is based on at least the second color standard; and associating the eighth device link profile with the first printing device so that the seventh device link profile is no longer associated with the first printing device. In an exemplary embodiment, the method includes running a first print job on the first substrate using the first printing device, the first color standard, and the second device link profile; running a second print job on the second substrate using the first printing device, the first color standard, and the fourth device link profile; running a third print job on the first substrate using the first printing device, the second color standard, and the sixth device link profile; and running a fourth print job on the second substrate using the first printing device, the second color standard, and the eighth device link profile.

An apparatus has been described that includes one or more processors; a computer readable medium operably coupled to the one or more processors; and a plurality of instructions stored on the computer readable medium and executable by the one or more processors, the plurality of instructions comprising instructions that cause the one or more processors to measure one or more color spaces of a first color target; instructions that cause the one or more processors to compare the measurements of the one or more color spaces with a first reference set of color values to thereby determine one or more color variances; instructions that cause the one or more processors to determine whether the one or more color variances are within their respective tolerances; and instructions that cause the one or more processors, if the one or more color variances are not within their respective tolerances, to: identify, using at least one of the measurements of the one or more color spaces, the first reference set of color values, and the one or more color variances, a first device link profile associated with a first printing device; generate a second device link profile associated with the first printing device, wherein the second device link profile is based on at least the first device link profile and the one or more color variances; and associate the second device link profile with the first printing device so that the first device link profile is no longer associated with the first printing device. In an exemplary embodiment, the first printing device is selected from the group consisting of a digital color press, an inkjet web press device, a grand format printing press device, and a digital offset press. In an exemplary embodiment, the first printing device is positioned at a first location; and wherein the plurality of instructions further comprises instructions that cause the one or more processors to transmit at least the measurements of the one or more color spaces to a second location that is different from the first location; and instructions that cause the one or more processors to transmit the second device link profile to the first printing device from a third location that either is the same as the second location, or is different than each of the first and second locations. In an exemplary embodiment, the first color target is printed on a first substrate in accordance with a first color standard using the first printing device; and wherein each of the first and second device link profiles comprises a plurality of identifiers, the plurality of identifiers comprising a first device identifier that identifies the first printing device; a first substrate identifier that identifies the first substrate; and a first color standard identifier that identifies the first color standard. In an exemplary embodiment, the first device link profile is part of a first plurality of device link profiles associated with the first printing device before the second device link profile is associated with the first printing device; wherein the second device link profile is part of the first plurality of device link profiles, and the first device link profile is not part of the first plurality of device link profiles, after the second device link profile is associated with the first printing device. In an exemplary embodiment, the first color target is printed on a first substrate in accordance with a first color standard using the first printing device; wherein each of the first and second device link profiles comprises a first plurality of identifiers, the first plurality of identifiers comprising a first device identifier that identifies the first printing device; a first color standard identifier that identifies the first color standard; and a first substrate identifier that identifies the first substrate; and wherein the plurality of instructions further comprises instructions that cause the one or more processors to identify a third device link profile associated with the first printing device, the third device link profile comprising a second plurality of identifiers, the second plurality of identifiers comprising a second device identifier that identifies the first printing device; a second color standard identifier that identifies the first color standard; and a second substrate identifier that identifies a second substrate that is different than the first substrate; instructions that cause the one or more processors to generate a fourth device link profile associated with the first printing device, wherein the fourth device link profile is based on at least: the third device link profile, the one or more color variances, and a predetermined first variation between the first and second substrates, wherein the predetermined first variation between the first and second substrates is based on at least the first color standard; and instructions that cause the one or more processors to associate the fourth device link profile with the first printing device so that the third device link profile is no longer associated with the first printing device. In an exemplary embodiment, the plurality of instructions further comprises instructions that cause the one or more processors to measure one or more color spaces of a second color target, wherein the second color target is printed on the first substrate in accordance with a second color standard using the first printing device; instructions that cause the one or more processors to compare the measurements of the one or more color spaces of the second color target with a second reference set of color values to thereby determine one or more other color variances; instructions that cause the one or more processors to determine whether the one or more other color variances are within their respective tolerances; and instructions that cause the one or more processors, if the one or more other color variances are not within their respective tolerances, to: identify, using at least one of the measurements of the one or more color spaces of the second color target, the second reference set of color values, and the one or more other color variances, a fifth device link profile associated with the first printing device, the fifth device link comprising a third plurality of identifiers, the third plurality of identifiers comprising a third device identifier that identifies the first printing device; a third color standard identifier that identifies the second color standard; and a third substrate identifier that identifies the first substrate; generate a sixth device link profile associated with the first printing device, wherein the sixth device link profile is based on at least the fifth device link profile and the one or more other color variances; associate the sixth device link profile with the first printing device so that the fifth device link profile is no longer associated with the first printing device; identify a seventh device link profile associated with the first printing device, the seventh device link profile comprising a fourth plurality of identifiers, the fourth plurality of identifiers comprising a fourth device identifier that identifies the first printing device; a fourth color standard identifier that identifies the second color standard; and a fourth substrate identifier that identifies the second substrate; generate an eighth device link profile associated with the first printing device, wherein the eighth device link profile is based on at least: the seventh device link profile, the one or more other color variances, and a predetermined second variation between the first and second substrates, wherein the predetermined second variation between the first and second substrates is based on at least the second color standard; and associate the eighth device link profile with the first printing device so that the seventh device link profile is no longer associated with the first printing device.

A system has been described that includes a central server; a first printing device in communication with the central server; one or more processors, wherein the central server comprises at least one of the one or more processors; a computer readable medium operably coupled to the one or more processors; a database stored on the computer readable medium; a first device link profile stored in the database and associated with the first printing device, the first device link profile comprising a first device identifier that identifies the first printing device, a first color standard identifier that identifies a first color standard, and a first substrate identifier that identifies a first substrate; and a computer program executable by the one or more processors and stored on at least one of the central server, the first printing device, the computer readable medium, and the database; wherein the computer program, when executed by the one or more processors, causes a second device link profile to be generated, associated with the first printing device, and stored in the database, so that the first device link profile is no longer associated with the first printing device; and wherein the second device link profile is based on at least the first device link profile and one or more color variances between: measurements of one or more color spaces of a first color target printed on the first substrate in accordance with the first color standard using the first printing device, and a first reference set of color values. In an exemplary embodiment, the system comprises a third device link profile stored in the database and associated with the first printing device, the third device link profile comprising a second device identifier that identifies the first printing device, a second color standard identifier that identifies the first color standard, and a second substrate identifier that identifies a second substrate; wherein a predetermined color variation between the first and second substrates is stored on at least one of the central server, the first printing device, the computer readable medium, and the database; wherein the computer program, when executed by the one or more processors, causes a fourth device link profile to be generated, associated with the first printing device, and stored in the database, so that the third device link profile is no longer associated with the first printing device; and wherein the fourth device link profile is based on at least the third device link profile, the one or more color variances, and the predetermined color variation. In an exemplary embodiment, the system includes a fifth device link profile stored in the database and associated with the first printing device, the fifth device link profile comprising a third device identifier that identifies the first printing device, a third color standard identifier that identifies a second color standard, and a third substrate identifier that identifies the first substrate; wherein the computer program, when executed by the one or more processors, causes a sixth device link profile to be generated, associated with the first printing device, and stored in the database, so that the fifth device link profile is no longer associated with the first printing device; and wherein the sixth device link profile is based on at least the fifth device link profile and one or more color variances between: measurements of one or more color spaces of a second color target printed on the first substrate in accordance with the second color standard using the first printing device, and a second reference set of color values. In an exemplary embodiment, the first printing device is communication with the central server via at least one of a network and a computing device.

It is understood that variations may be made in the foregoing without departing from the scope of the present disclosure.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures.

What is claimed is:

1. A method comprising:
   measuring one or more color spaces of a first color target;
   comparing the measurements of the one or more color spaces with a first reference set of color values to thereby determine one or more color variances;
   determining whether the one or more color variances are within their respective tolerances;
   if the one or more color variances are not within their respective tolerances, then:
      identifying, using at least one of the measurements of the one or more color spaces, the first reference set of color values, and the one or more color variances, a first device link profile associated with a first printing device;
      generating a second device link profile associated with the first printing device, wherein the second device link profile is based on at least the first device link profile and the one or more color variances; and
      associating the second device link profile with the first printing device so that the first device link profile is no longer associated with the first printing device;
   wherein the first color target is printed on a first substrate in accordance with a first color standard using the first printing device;
   wherein each of the first and second device link profiles comprises a plurality of identifiers, the plurality of identifiers comprising:
      a first device identifier that identifies the first printing device;
      a first substrate identifier that identifies the first substrate; and
      a first color standard identifier that identifies the first color standard; and
   wherein transmitting at least the measurements of the one or more color spaces to the second location comprises transmitting at least the measurements to a central server located at the second location, the central sever comprising a processor;
   wherein identifying the first device link profile comprises using the central server to identify the first device link profile in a database accessible to the processor;
   wherein generating the second device link profile comprises using the central server to generate the second device link profile; and
   wherein associating the second device link profile with the first printing device so that the first device link profile is no longer associated with the first printing device comprises replacing the first device link profile with the second device link profile in the database.

2. A method comprising:
   measuring one or more color spaces of a first color target wherein the first color target is printed on a first substrate in accordance with a first color standard using the first printing device;
   comparing the measurements of the one or more color spaces with a first reference set of color values to thereby determine one or more color variances;
   determining that the one or more color variances are not within their respective tolerances; and
   then:
      identifying, using at least one of the measurements of the one or more color spaces, the first reference set of color values, and the one or more color variances, a first device link profile associated with a first printing device;
      generating a second device link profile associated with the first printing device, wherein the second device link profile is based on at least the first device link profile and the one or more color variances;
      wherein each of the first and second device link profiles comprises a first plurality of identifiers, the first plurality of identifiers comprising:
         a first device identifier that identifies the first printing device;
         a first color standard identifier that identifies the first color standard; and
         a first substrate identifier that identifies the first substrate;
   associating the second device link profile with the first printing device so that the first device link profile is no longer associated with the first printing device; and
   wherein the method further comprises:
      identifying a third device link profile associated with the first printing device, the third device link profile comprising a second plurality of identifiers, the second plurality of identifiers comprising:
         a second device identifier that identifies the first printing device;
         a second color standard identifier that identifies the first color standard; and
         a second substrate identifier that identifies a second substrate that is different than the first substrate;
      generating a fourth device link profile associated with the first printing device, wherein the fourth device link profile is based on at least:
         the third device link profile,
         the one or more color variances, and
         a predetermined first variation between the first and second substrates, wherein the predetermined first variation between the first and second substrates is based on at least the first color standard;
      and
      associating the fourth device link profile with the first printing device so that the third device link profile is no longer associated with the first printing device.

3. The method of claim 2, wherein the first printing device is selected from the group consisting of a digital color press, an inkjet web press device, a grand format printing press device, and a digital offset press.

4. The method of claim 2, wherein the first printing device is positioned at a first location; and
wherein the method further comprises:
transmitting at least the measurements of the one or more color spaces to a second location that is different from the first location; and
transmitting the second device link profile to the first printing device from a third location that either is the same as the second location, or is different than each of the first and second locations.

5. The method of claim 2, wherein the first device link profile is part of a first plurality of device link profiles associated with the first printing device before the second device link profile is associated with the first printing device;
wherein the second device link profile is part of the first plurality of device link profiles, and the first device link profile is not part of the first plurality of device link profiles, after the second device link profile is associated with the first printing device.

6. The method of claim 2, further comprising:
measuring one or more color spaces of a second color target, wherein the second color target is printed on the first substrate in accordance with a second color standard using the first printing device;
comparing the measurements of the one or more color spaces of the second color target with a second reference set of color values to thereby determine one or more other color variances;
determining whether the one or more other color variances are within their respective tolerances; and
if the one or more other color variances are not within their respective tolerances, then:
identifying, using at least one of the measurements of the one or more color spaces of the second color target, the second reference set of color values, and the one or more other color variances, a fifth device link profile associated with the first printing device, the fifth device link comprising a third plurality of identifiers, the third plurality of identifiers comprising:
a third device identifier that identifies the first printing device;
a third color standard identifier that identifies the second color standard; and
a third substrate identifier that identifies the first substrate;
generating a sixth device link profile associated with the first printing device, wherein the sixth device link profile is based on at least the fifth device link profile and the one or more other color variances;
associating the sixth device link profile with the first printing device so that the fifth device link profile is no longer associated with the first printing device;
identifying a seventh device link profile associated with the first printing device, the seventh device link profile comprising a fourth plurality of identifiers, the fourth plurality of identifiers comprising:
a fourth device identifier that identifies the first printing device;
a fourth color standard identifier that identifies the second color standard; and
a fourth substrate identifier that identifies the second substrate;
generating an eighth device link profile associated with the first printing device, wherein the eighth device link profile is based on at least:
the seventh device link profile,
the one or more other color variances, and
a predetermined second variation between the first and second substrates, wherein the predetermined second variation between the first and second substrates is based on at least the second color standard;
and
associating the eighth device link profile with the first printing device so that the seventh device link profile is no longer associated with the first printing device.

7. The method of claim 6, further comprising:
running a first print job on the first substrate using the first printing device, the first color standard, and the second device link profile;
running a second print job on the second substrate using the first printing device, the first color standard, and the fourth device link profile;
running a third print job on the first substrate using the first printing device, the second color standard, and the sixth device link profile; and
running a fourth print job on the second substrate using the first printing device, the second color standard, and the eighth device link profile.

8. An apparatus comprising:
one or more processors;
a computer readable medium operably coupled to the one or more processors; and
a plurality of instructions stored on the computer readable medium and executable by the one or more processors, the plurality of instructions comprising:
instructions that cause the one or more processors to measure one or more color spaces of a first color target wherein the first color target is printed on a first substrate in accordance with a first color standard using the first printing device;
instructions that cause the one or more processors to compare the measurements of the one or more color spaces with a first reference set of color values to thereby determine one or more color variances;
instructions that cause the one or more processors to determine whether the one or more color variances are within their respective tolerances; and
instructions that cause the one or more processors, when the one or more color variances are not within their respective tolerances, to:
identify, using at least one of the measurements of the one or more color spaces, the first reference set of color values, and the one or more color variances, a first device link profile associated with a first printing device;
generate a second device link profile associated with the first printing device, wherein the second device link profile is based on at least the first device link profile and the one or more color variances and wherein each of the first and second device link profiles comprises a first plurality of identifiers, the first plurality of identifiers comprising:
a first device identifier that identifies the first printing device;
a first color standard identifier that identifies the first color standard; and a first substrate identifier that identifies the first substrate; and
associate the second device link profile with the first printing device so that the first device link profile is no longer associated with the first printing device; and
wherein the plurality of instructions further comprises:
instructions that cause the one or more processors to identify a third device link profile associated with the first printing device, the third device link profile comprising a second plurality of identifiers, the second plurality of identifiers comprising:
a second device identifier that identifies the first printing device;
a second color standard identifier that identifies the first color standard; and
a second substrate identifier that identifies a second substrate that is different than the first substrate;
instructions that cause the one or more processors to generate a fourth device link profile associated with the first printing device, wherein the fourth device link profile is based on at least:
the third device link profile,
the one or more color variances, and
a predetermined first variation between the first and second substrates, wherein the predetermined first variation between the first and second substrates is based on at least the first color standard;
and
instructions that cause the one or more processors to associate the fourth device link profile with the first printing device so that the third device link profile is no longer associated with the first printing device.

9. The apparatus of claim 8, wherein the first printing device is selected from the group consisting of a digital color press, an inkjet web press device, a grand format printing press device, and a digital offset press.

10. The apparatus of claim 8, wherein the first printing device is positioned at a first location; and
wherein the plurality of instructions further comprises:
instructions that cause the one or more processors to transmit at least the measurements of the one or more color spaces to a second location that is different from the first location; and
instructions that cause the one or more processors to transmit the second device link profile to the first printing device from a third location that either is the same as the second location, or is different than each of the first and second locations.

11. The apparatus of claim 8, wherein the plurality of instructions further comprises:
instructions that cause the one or more processors to measure one or more color spaces of a second color target, wherein the second color target is printed on the first substrate in accordance with a second color standard using the first printing device;
instructions that cause the one or more processors to compare the measurements of the one or more color spaces of the second color target with a second reference set of color values to thereby determine one or more other color variances;
instructions that cause the one or more processors to determine whether the one or more other color variances are within their respective tolerances; and
instructions that cause the one or more processors, if the one or more other color variances are not within their respective tolerances, to:
identify, using at least one of the measurements of the one or more color spaces of the second color target, the second reference set of color values, and the one or more other color variances, a fifth device link profile associated with the first printing device, the fifth device link comprising a third plurality of identifiers, the third plurality of identifiers comprising:
a third device identifier that identifies the first printing device;
a third color standard identifier that identifies the second color standard; and
a third substrate identifier that identifies the first substrate;
generate a sixth device link profile associated with the first printing device, wherein the sixth device link profile is based on at least the fifth device link profile and the one or more other color variances;
associate the sixth device link profile with the first printing device so that the fifth device link profile is no longer associated with the first printing device;
identify a seventh device link profile associated with the first printing device, the seventh device link profile comprising a fourth plurality of identifiers, the fourth plurality of identifiers comprising:
a fourth device identifier that identifies the first printing device;
a fourth color standard identifier that identifies the second color standard; and
a fourth substrate identifier that identifies the second substrate;
generate an eighth device link profile associated with the first printing device,
wherein the eighth device link profile is based on at least:
the seventh device link profile,
the one or more other color variances, and
a predetermined second variation between the first and second substrates, wherein the predetermined second variation between the first and second substrates is based on at least the second color standard;
and
associate the eighth device link profile with the first printing device so that the seventh device link profile is no longer associated with the first printing device.

12. A method of operating a plurality of printing devices comprising:
providing a plurality of printing devices, each at a separate location;
operating at least one of the plurality of printing devices;
storing a plurality of device link profiles and a plurality of reference set of color values at a location remote from the printing devices, each of the plurality of device link profiles associated with one of the plurality of printing devices;
for the operating printing device, measuring one or more color spaces of a first color target at the location of the printing device to generate measured color values;
transmitting the measured color values to a location remote from the operating printing device along with an identifier associated with the operating printing device;
receiving the measured color value and the associated identifier at the remote location;

based on the associated identifier, accessing one of the plurality of device link profiles;

comparing the measured color values of the one or more color spaces with a first reference set of color values to determine one or more color variances for the operating printing device;

determining whether the one or more color variances are within their respective tolerances; and if the one or more color variances are not within their respective tolerances, then:
- identifying, using at least one of the measurements of the one or more color spaces, the first reference set of color values, and the one or more color variances, a first device link profile associated with the operating printing device;
- generating a second device link profile associated with the operating printing device, wherein the second device link profile is based on at least the first device link profile and the one or more color variances;
- associating the second device link profile with the operating printing device using the transmitted identifier so that the first device link profile stored at the remote location is no longer associated with the operating printing device;
- transmitting the second device link profile based on the identifier to the operating printing device; and
- replacing the first device link profile with the second device link profile at the operating printing device; and continuing to operate the operating printing device.

13. The method of claim 12, wherein the steps of measuring, comparing and replacing occur during ongoing operation of the at least one of the plurality of printing devices.

14. The method of claim 12, further comprising:
issuing a query for the second device link profile; and
wherein the step of transmitting the second device link profile based on the identifier to the operating printing device comprises automatically pushing the second device link profile to the operating printing device when the query identifies the second device link profile.

* * * * *